(12) United States Patent
Rome et al.

(10) Patent No.: US 6,337,901 B1
(45) Date of Patent: Jan. 8, 2002

(54) CUSTOMER BILLING RELATIONSHIPS SOFTWARE

(75) Inventors: Joseph B. Rome, Hoover, AL (US); Raymonda J. Parris, Peachtree City; Susan S. O'Bryan, Marietta, both of GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/418,823

(22) Filed: Oct. 15, 1999

(51) Int. Cl.[7] .............................................. H04M 15/00
(52) U.S. Cl. ............................... 379/112.01; 379/114.1; 379/120; 379/121.02
(58) Field of Search .................................. 379/112, 113, 379/114, 115, 118, 121, 124, 128, 133, 134, 135, 120, 125, 126, 144, 207

(56) References Cited

U.S. PATENT DOCUMENTS

| | | | | |
|---|---|---|---|---|
| 5,732,127 A | * | 3/1998 | Hayes ......................... | 379/115 |
| 5,815,559 A | * | 9/1998 | Schnable .................... | 379/112 |
| 5,832,068 A | * | 11/1998 | Smith ......................... | 379/113 |
| 5,983,196 A | * | 11/1999 | Wendkos ..................... | 705/14 |
| 6,005,926 A | * | 12/1999 | Mashinsky .................. | 379/114 |
| 6,011,837 A | * | 1/2000 | Malik .......................... | 379/112 |
| 6,052,447 A | * | 4/2000 | Golden et al. ............... | 379/114 |
| 6,144,726 A | * | 11/2000 | Cross .......................... | 379/112 |

OTHER PUBLICATIONS

09/418,824 Ex. Felten (A.U. 2164) Class/Sub: 705/040.

* cited by examiner

*Primary Examiner*—Binh Tieu
(74) *Attorney, Agent, or Firm*—Shaw Pittman LLP

(57) ABSTRACT

A computer network architecture and software that accesses multiple telephone billing systems across multiple telephone service regions, provides a telecommunications service provider with a consolidated view of a customer's telephone usage, and provides means for creating, automatically implementing, and monitoring billing plans based on customer billing relationships illustrated in the consolidated view. The present invention pulls information from different billing systems and presents the telecommunications service provider with a consolidated account view that summarizes a customer's total worth to the service provider, rather than listing a series of unrelated accounts for the same customer. With the individualized consolidated views, a telecommunications service provider can formulate and implement flexible terms and conditions for each customer. The computer network architecture also supports extensive reporting capabilities and means for correcting the accounts presented in the consolidated views. Further, the architecture enables automatic implementation of billing plans without coding software programs.

33 Claims, 30 Drawing Sheets

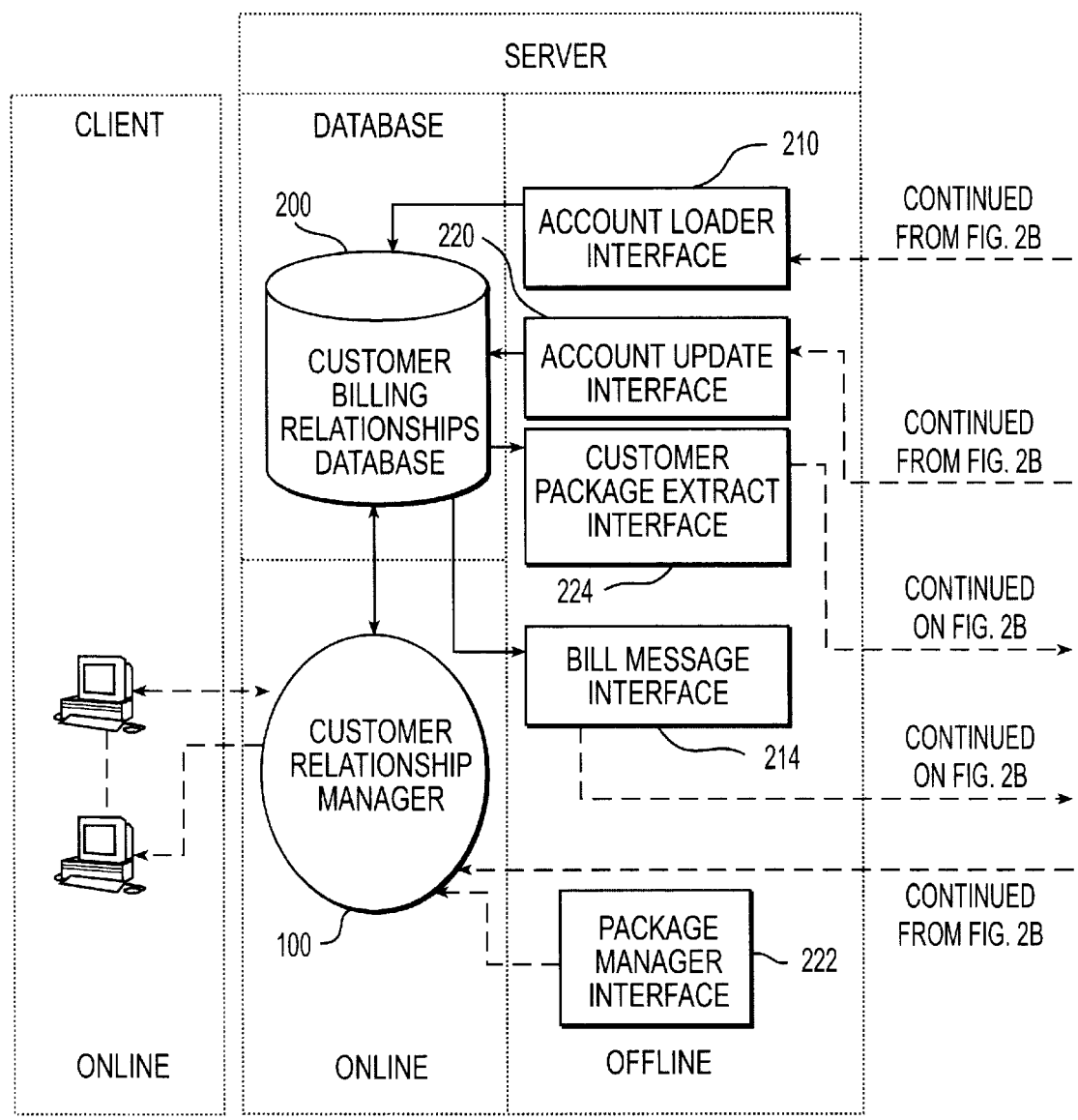
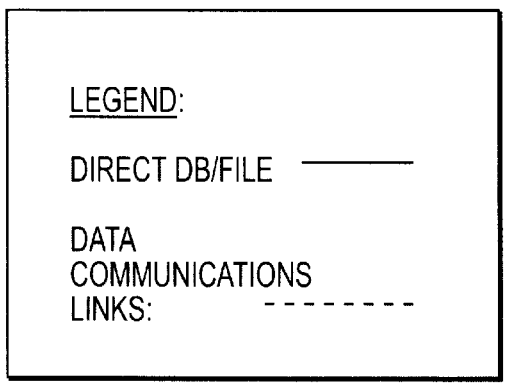
FIG. 2A

| Customer | Tabs | Desktop | Windows | Help |

| NEW | OPEN | CREATE FROM | SAVE | HIERARCHY | TBR REPORT | CREATE T AND C | CLOSE |

ID: AC000002RMFC NAME: ABCD COMPANY

ID: AC000002RMFC    ENTERED BY: IRWCQGC
STATUS: ACTIVE
NAME: ABCD COMPANY    STATE: ▶
COU: BBS ▶    MODIFIABLE BY: CREATOR'S COU
PARENT CUSTOMER: ABC COMPANY

DATES
CREATION DATE: 10/08/1999    DEACTIVATED DATE:

FIND...

| Basic Info | Cust Contact | BST Contact | Assoc Accts | Assoc Custs | Acct Match | Assoc T&Cs | Rmks |

FIG. 5

| Account | Tabs | Desktop | Windows | Help |

[NEW] [OPEN] [SAVE] [HIERARCHY] [CREATE CUSTOMER] [CLOSE]

ACCT #: (CPNI)(205) 426-3350 350   NAME: ROME, J BRENT

STATUS:  ACTIVE

LISTED NAME: [ROME, J BRENT]

PARENT CUSTOMER: [ABCD COMPANY]

DATES
CREATION DATE:  12/13/1998   COU:  CONSUMER

DEACTIVATED DATE:    STATE:  AL

[FIND...]

| CRIS Basic Info | CRIS Detail | Revenue | T & C Rev | Reward/Penalty |

| * | NOT ACTIVATED IN CUSTOM TEMPLATE |
| ** | NOT ACTIVATED IN STANDARD TEMPLATE |
| *** | NOT ACTIVATED IN STANDARD T &C |

| * ALT. | ALTERNATE MESSAGE DISPLAYED |
| * MOD. | MESSAGE DISPLAYED WHEN A USER MODIFIES A T & C |
| ⦿ | RADIO BUTTON |

FIG. 12E

| | |
|---|---|
| * | NOT ACTIVATED IN CUSTOM TEMPLATE |
| ** | NOT ACTIVATED IN STANDARD TEMPLATE |
| *** | NOT ACTIVATED IN STANDARD T &C |

| | |
|---|---|
| * ALT. | ALTERNATE MESSAGE DISPLAYED |
| * MOD. | MESSAGE DISPLAYED WHEN A USER MODIFIES A T & C |
| ⦿ | RADIO BUTTON |
| ↓ | DROPDOWN LIST BOX |

FIG. 13G

CUSTOMER BILLING RELATIONSHIPS SOFTWARE

BACKGROUND

1. Field of the Invention

The present invention relates to the field of customer billing software, and in particular, to an architecture and method for compiling customer billing information from multiple billing systems and service regions, for presenting consolidated views of the revenue derived from customers, and for creating and monitoring terms and conditions based on customer billing relationships illustrated in the consolidated views.

2. Background of the Invention

Before 1984, the Bell telephone system consisted of 22 local Bell telephone companies that were owned by American Telephone and Telegraph (AT&T). AT&T and the local Bell companies sold local, domestic U.S., and international long distance services, as well as customer premises telephone hardware. Customers had one point of contact for all of their telecommunications requirements and AT&T effectively held a monopoly on all telephone services. To meet the accounting needs of this monopoly during this period, AT&T developed billing information technologies and applications that tracked telephone service usage and billing records. These early software and database technologies were relatively primitive and did not allow for the complete integration of billing information across different types of customer accounts, customer operating units (e.g., consumer or small business), and geographic locations (e.g., regional accounting offices). Today, these early billing technologies are referred to as legacy technologies.

In 1984, the United States government ordered the divestiture of AT&T, requiring AT&T to transfer ownership of the 22 local phone companies to seven Regional Bell Operating Companies (RBOCs). The seven RBOCs retained the "Bell" logo and the right to sell local and toll calling within local areas. Further, the RBOCs continued to use the legacy technologies to administer customer accounts and track billing activities within their individual regions. During this period, because minimal competition existed within the regions of the RBOCs, the RBOCs held monopolies within their individual regions, giving them little incentive to pursue customers by analyzing customer value across the region and developing targeted marketing programs. Essentially, RBOCs had guaranteed customers who would use the RBOC regardless of discounting or other promotional programs.

However, in 1996, the United States Congress enacted the Telecommunications Act of 1996, opening the Bell territories to competition from long distance vendors, cable companies, local access providers, utility companies, and other RBOCs. As a result, telecommunications service providers (collectively, "Telcos") could compete in each other's markets and develop and market new products and services for a wider customer base. Thus, for the first time, RBOCs found it necessary to understand and analyze customer accounts and billing activity within the different RBOC regions and the different legacy systems. Armed with this information, RBOCs could develop customer-specific discount programs and promotions based on the revenue derived from that particular customer. With increased competition, the RBOCs needed to analyze customer value and offer discount programs that encouraged customer use while maximizing RBOC profit.

To analyze customer value within a service region, RBOCs must consolidate revenue information across the "artificial boundaries" in a RBOC region. These artificial boundaries are defined by the original legacy systems developed by AT&T, the customer operations units (COUs) established by the RBOC to handle specific customer types, and the regional accounting offices (RAOs) within the RBOC region formed to distribute the administrative and accounting functions of the RBOC. Each of these entities maintains information on customers in separate databases. Thus, when a customer falls under more than one customer type and/or within more than one artificial boundary, that customer's billing information is strewn across several individual databases. Therefore, to completely understand a customer's value to the Telco within the overall region, the information must be consolidated and summarized.

In analyzing customer revenue, the two principal legacy systems are the Customer Records Information System (CRIS) and the Carrier Access Billing System (CABS). CRIS maintains billing records for all retail RBOC telephone customers, including residential and business customers. CRIS produces billing records for each telephone line connected to the network. Typically, the Telco sends a billing statement to the retail customers, or "end-users," on a monthly basis.

CABS maintains billing records for wholesale customers who purchase large blocks of telephone capacity from the RBOCs, usually at rates discounted from retail prices. Typical wholesale customers include large corporate clients or blocks of consumers seeking lower rates through high volume usage of the system as well as businesses that purchase telephone capacity for resale to individual consumers.

AT&T developed CRIS and CABS legacy systems as independent applications, without means for integrating and summarizing the information they contain. Thus, to understand a customer's potential value, Telcos must consult several different billing systems, analyze the data, and assemble a summary view of the customer's billing activity and revenue. Therefore, to establish discount plans for individual customers covered by multiple billing systems and service regions, Telcos must endure a tedious, manual process. The first step in this process is to gather the revenue data from the multiple billing systems and service regions that service the customer . In addition to the two billing systems, CRIS and CABS, the process requires consulting multiple COUs and pulling data from the various RAOs operating in each service region. With the data gathered, the next step requires business analysts to compile the information and present it in a way that conveys the overall profits derived from the customer. Guided by this profit summary, the next step requires business managers and marketing analysts to develop a discount plan that increases the customer's use of telephone services and maximizes profit. Finally, with a discount plan outlined, the final step is to build a software program in machine code that executes the desired discounts.

As would be apparent to one of ordinary skill in the art, this process could last well over a year, especially when factoring in the administrative steps of submitting work requests, prioritizing the customer needs associated with the work requests, procuring development funds, assigning personnel to analyze customer revenue data, and writing, de-bugging, and deploying the software. In addition, the process only provides a single instance of a discount plan, making it necessary to repeat the exercise for each different plan and/or customer.

DEFINITIONS

As used in this specification and the claims, the following terms have the meanings described below.

Customer Operating Unit (COU): business units or divisions of a Telco, formed to address the needs of specific customer types, e.g., consumer services, small business services, complex business systems, and interconnection services.

Regional Accounting Office (RAO): office within the RBOC region formed to distribute the administrative and accounting functions of the RBOC.

Other-Charges-and-Credits Transactions: fractional and/or one type charges or credits.

Package: the bundling of two or more Telco products or services for the purposes of discounting or other customer retention efforts.

COBOL: a software programming language generally used for business applications.

C++: a high-level programming language.

Sybase™: a computer software application for storing, managing, and manipulating data in a relational database.

UNIX: a computer operating system for running data processing and telephone systems, which provides multi-tasking and multi-user capabilities.

Object Request Broker (ORB): an object-oriented system consisting of middleware that manages message traffic between application software and computer/software platforms.

SUMMARY OF THE INVENTION

The present invention is a computer network architecture that develops software applications to execute customer-specific billing programs. The present invention, referred to as a Customer Billing Relationships network architecture, summarizes information from multiple telephone billing systems across multiple telephone service regions and provides a Telco with a consolidated view of a customer's telephone usage. By presenting billing activity and revenue totals, the consolidated view gives the Telco a comprehensive understanding of a particular customer's value, enabling the Telco to formulate customer-specific billing plan terms, conditions, and discounts. Further, the present invention provides means to automatically implement customer-specific billing plans using a table update that requires no software code programming.

In addressing the needs of the prior art, the present invention replaces the prior art steps of manually gathering, compiling, and presenting, in customer billing relationships, billing information from multiple billing systems and service regions. The other tedious steps of the prior art method, involving, among other things, developing (calculating) a discount plan or product package, and implementing that package by building a software program in machine code that executes the discounts or package, are addressed in a concurrently filed patent application entitled "Product Packaging Software" by Joseph Brent Rome, Raymonda J. Parris, and Susan S. O'Bryan, filed Oct. 15, 1999 (application Ser. No. 09/418,828), which is hereby incorporated by reference.

In the preferred embodiment of the present invention, the network architecture accesses the two legacy billing systems, CRIS and CABS, to create a consolidated view of a particular customer billing relationship. The billing relationship represents a particular customer's account activity across multiple customer operations units and revenue accounting offices. Customer operations units are the individual business units that serve particular types of customers, e.g., consumer services, small business services, complex business systems, and interconnection services. Revenue accounting offices run the legacy systems, providing the customer data stored in the billing systems. The customer billing relationship gives the telephone service provider a comprehensive understanding of the value of a customer. With this understanding, the telephone service provider can tailor discount programs that meet the specific needs of a customer and encourage continued business at increasing usage volumes.

Specifically, the customer billing relationship provides a consolidated view of an account structure, grouping together accounts that are logically one customer (e.g., an affinity group or parent/child relationship), relating customers to other customers, and providing unique customer-based information that cannot be obtained using only the CRIS or the CABS account structures. With these individualized consolidated views, Telcos can formulate flexible terms and conditions for each customer, addressing specific terms such as commitment levels, business actions (rewards or penalties), termination liability, and volume discounts based on meeting a specified total revenue threshold for a given time period. The Telcos can apply different terms and conditions to different customers and to the specific products and services of each customer.

Once a Telco has analyzed the customer billing relationship and formulated a customer-specific billing plan, the present invention quickly and easily executes the plan. Instead of the time-consuming process of manual software coding ("hard coding") known in the prior art, the network architecture of the present invention quickly generates discounts plans and automatically applies them to customer accounts. To automatically apply the billing plans, the customer billing relationship pulls information from the legacy systems, calculates charges or credits dictated by the discount plan, and sends totals back to the legacy system for inclusion in the customer billing statement.

In addition to creating and implementing customer-specific billing plans based on a consolidated view, the preferred embodiment of the present invention also supports extensive reporting capabilities and means for correcting accounts. The reporting capabilities provide detailed summaries describing billing information such as the total amount of rewards a customer has received, the specific accounts receiving such rewards, and the amount of revenue collected from a particular customer. In providing a means for correcting accounts, the present invention allows Telcos to adjust rewards that were applied to the account but for which the customer's billing activity did not qualify. Through GUIs, a Telco can enter corrections or adjustments into the customer billing relationship, which are then calculated and applied to the legacy systems.

Thus, the present invention supplants the time consuming process of the prior art by quickly compiling customer revenue data from multiple billing systems and regions, presenting the data in consolidated views of customer billing relationships, and automatically implementing customer-specific billing programs without requiring the "hard coding" of software. In addition, the present invention provides means for producing reports that assist in monitoring the success of the billing programs, and means for correcting discounts or penalties erroneously applied to a customer account.

Accordingly, an object of the present invention is to provide a Telco with a consolidated view of a customer's account summarizing information from multiple billing systems and multiple telephone service regions.

It is another object of the present invention to provide a Telco with the information necessary to create and update customer-specific terms and conditions and to provide means to accomplish such creating and updating.

It is another object of the present invention to allocate and apply rewards and penalties to specific customer accounts.

It is another object of the present invention to generate standard and on-demand reports on terms and conditions.

These and other objects of the present invention are described in greater detail in the detailed description of the invention, the appended drawings, and the attached claims.

DESCRIPTION OF THE DRAWINGS

FIGS. 2A and 2B are diagrams of the Customer Billing Relationships Manager business application architecture, showing its online functions, offline functions, and its interfaces and relationships with other applications and systems.

FIG. 5 is a picture of an initial customer screen through which a Telco creates a customer.

FIG. 8 is a picture of an initial account screen through which a Telco creates an account.

FIG. 11 is a picture of a terms and conditions screen through which a Telco establishes terms and conditions for an account.

FIGS. 12A–12E are diagrams of a terms and conditions toolbar workflow through which a Telco establishes terms and conditions for an account.

FIGS. 13A–13G are diagrams of a terms and conditions tab workflow through which a Telco establishes terms and conditions for an account.

DETAILED DESCRIPTION OF THE INVENTION

The present invention is a Customer Billing Relationships accounting software system. For clarity, the invention is described below from two perspectives: an application architecture and a technical architecture. The application architecture defines how the present invention organizes business functions and divides the functions into business applications, which are further broken down into software components. The technical architecture defines the underlying information technologies, addressing their configurations and locations. The technical architecture explains the leveraging of existing legacy technologies and applications, while introducing advanced information technologies where appropriate.

Application Architecture

The application architecture of the Customer Billing Relationships system is composed of separate business applications. In the preferred embodiment, to accommodate the business applications used by most RBOCs, the present invention is comprised of the following two business applications: (1) Customer Billing Relationships Manager, and (2) Customer Terms and Conditions Manager. These business applications are logical groupings of related functionality and are presented only for the purpose of illustrating the present invention. The invention should not be construed as limited to these groupings of functionality.

Figure 1:
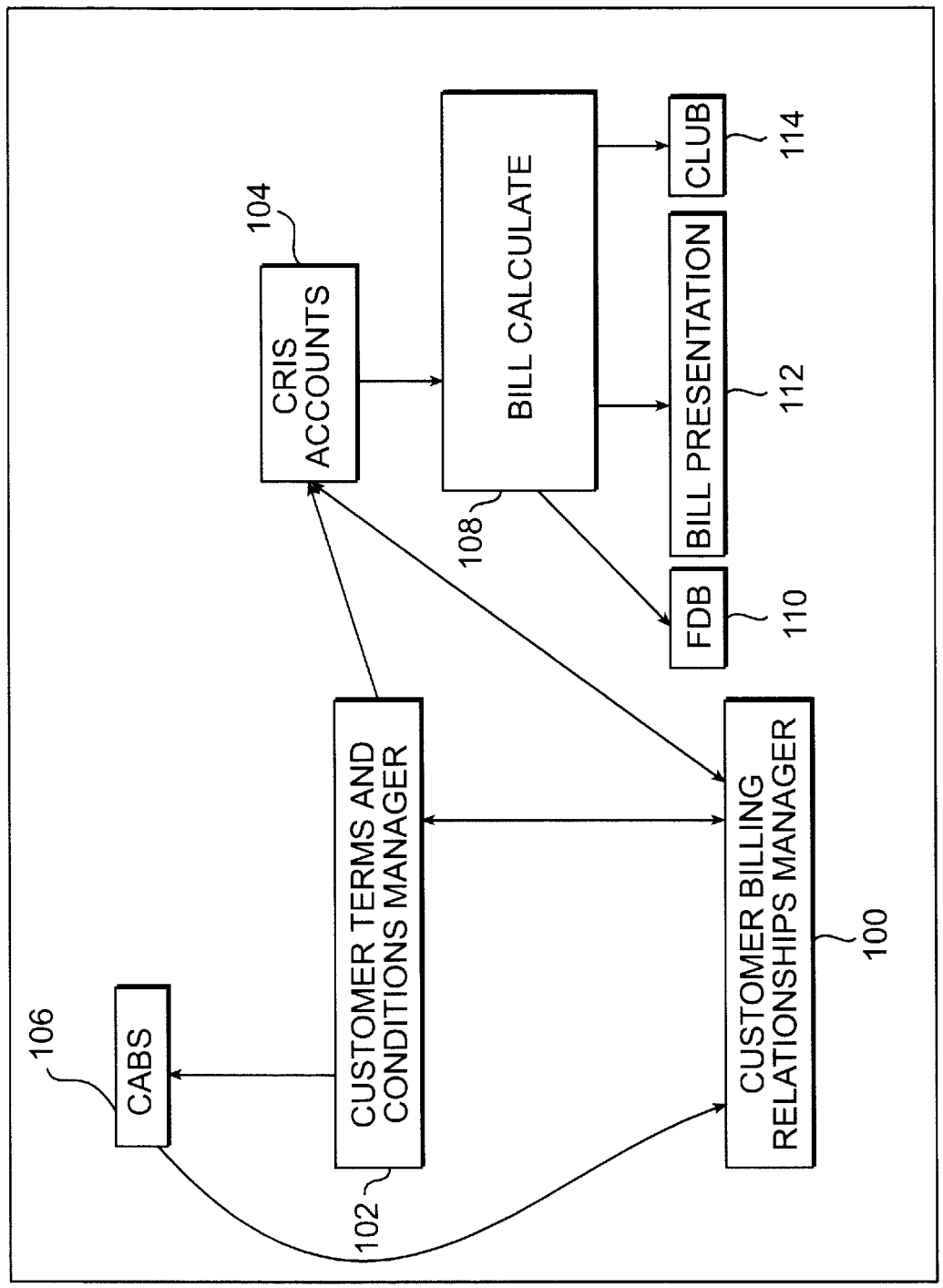
FIG. 1 is a diagram of the application architecture of the present invention.

FIG. 1 illustrates the overall application architecture of the present invention, showing how the business applications relate to each other and to existing systems. Customer Billing Relationships Manager 100 interfaces with Customer Terms and Conditions Manager 102, CRIS 104, and CABS 106. Customer Billing Relationships Manager 2 is an application responsible for creating and maintaining a "customer view" of the account structure. The customer view groups together accounts that are logically one customer, relating customers to other customers, and provides unique customer-based information that cannot be obtained using CRIS 104 or CABS 106 account structures. Customer Billing Relationships Manager 100 includes both client and server-based application components that support online tasks and significant server and mainframe batch interfaces that support offline data maintenance and exchange between legacy systems.

Customer Terms and Conditions Manager 102 application interfaces with Customer Billing Relationships Manager 100, CRIS 104, and CABS 106, and provides means to establish, monitor, take action, and report on terms and conditions offered to each customer. The application is integrated with the Customer Billing Relationships Manager 100 and provides the information and functionality that may be used separately or together with Customer Billing Relationships Manager 100. The application includes both online and offline transaction capabilities as well as internal monitoring functionality capable of triggering both online and offline activity. The application supports both retail and wholesale contracts and has external interfaces to both CRIS 104 and CABS 106.

Bill Calculate 108 interfaces with CRIS 104 to access account information and perform calculations such as aggregating individual entries, applying taxes, and calculating totals. Once the account information is compiled, Bill Calculate 108 interfaces with Financial Database (FDB) 110 to produce account summaries, such as sales reports and journals, using ancillary systems. Bill Calculate 108 interfaces with Bill Presentation 112 to print account information. And finally, Bill Calculate 108 interfaces with Customized Large User Bill (CLUB) 114 to produce specially formatted account summaries for large and complex users.

In light of the above-defined application architecture, the following discussion and related figures describe the specific online and offline functions of each business application and the interfaces between them.

Customer Billing Relationships Manager

Figure 2B:
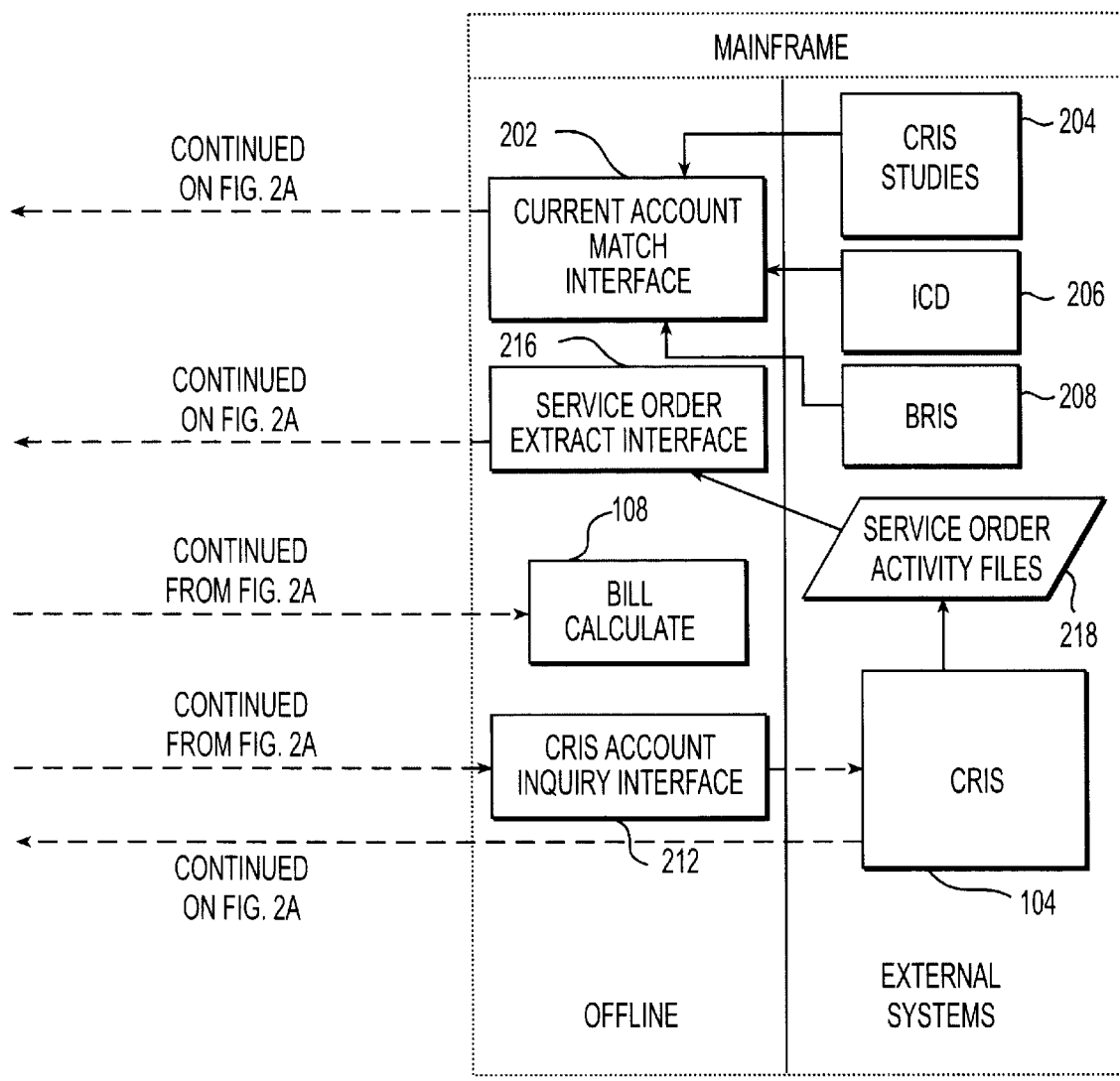

As shown in FIGS. 2A and 2B, the architecture of Customer Billing Relationships Manager 100 includes both client and server-based components to support online tasks as well as significant server and mainframe batch interfaces to support offline data maintenance and the exchange of information with other business applications and legacy systems. The online facilities have graphical user interfaces that enable the creation and maintenance of customer hierarchies, account relationships, and customer package information. In the preferred embodiment of the present invention, the GUIs are written in SmallTalk™ and communicate with an application server located on a UNIX system to perform business logic, to access current systems data via a communications link, and to provide database access.

Customer Billing Relationships Database 200 is the online database for the Customer Billing Relationships Manager 100. It holds all data maintained by the Customer Billing Relationships Manager 100 and serves as the primary source of information for the Customer Terms and Conditions Manager 102. In the preferred embodiment of the present invention, Customer Billing Relationships Database 200 is implemented as a series of Sybase™ System databases residing on UNIX systems.

With regard to offline facilities, Customer Billing Relationships Manager 100 includes a complex set of interfaces and processes that support high-volume data processing. Current Account Match Interface 202 runs on the mainframe system and is used to access account relationships already identified by other systems, e.g., CRIS Studies 204, Integrated Customer Database (ICD) 206, and Business Revenue Information System (BRIS) 208. These systems deliver extracts to the Current Account Match Interface 202, which re-formats the extracts and sends them out to a set of Customer Operating Unit specific files. The files are downloaded via a data communications link to appropriate servers, which contain Customer Billing Relationships Database 200. The files are then loaded into Customer Billing Relationships Database 200 by the Account Loader Interface 210, as described below.

Account Loader Interface 210 provides Customer Billing Relationships Database 200 with the account relationships extracted by Current Account Match Interface 202. Account Loader Interface 210 reads and compares the contents of the files received from Current Account Match Interface 202 with the existing account matches on Customer Billing Relationships Database 200. New matches, discrepancies, and inconsistencies are loaded and marked for review. In the preferred embodiment of the present invention, Account Loader Interface 210 is executed on an application server and runs in coordination with Current Account Match Interface 202.

CRIS Account Inquiry Interface 212 retrieves from CRIS 104 account information needed to support account verification and to supplement the data contained in the Customer Billing Relationships Database 200. Customer Billing Relationships Manager 100 verifies the accuracy of the account information before adding it to Customer Billing Relationships Database 200. If the inquiries initiated within Customer Billing Relationships Manager 100 require additional account information not stored in Customer Billing Relationships Database 200, the applications server of CRIS Account Inquiry Interface 212 will execute a near-time interface via a communications link to CRIS 104 that exchanges data, e.g., a Common Object Request Broker Architecture communications link. When the information is returned, the server forwards the information to the appropriate GUI where the information is displayed.

Bill Message Interface 214 creates a file of phrase code other-change-and-credit transactions that are delivered to CRIS 104. A phrase code is a hard-coded bill message. Bill Message Interface 214 marks accounts that have a high probability of being related to the same customer. The mark indicates that Bill Message Interface 214 must send a bill message to CRIS 104 asking for verification. The marked accounts are the input for this interface and the actual matching accounts may be included with the phrase code as variables to appear with the message. Bill Message Interface 214 creates a file of other-change-and-credit transactions that are uploaded to the appropriate mainframe via a data communications link and loaded into a Miscellaneous Input source file (not shown).

Service Order Extract Interface 216 updates Customer Billing Relationships Manager 100 with the constantly changing information in CRIS 104. The interface reads the daily service order activity posted to the accounts in Customer Billing Relationships Database 200, pares down the records entered for the day, re-formats the records to include only those elements needed to maintain Customer Billing Relationships Database 200, and then writes the records out to a series of Service Order Activity Files 218. The files are downloaded to the appropriate server via a data communications link. The interface executes daily and also can be used as an offline vehicle for adding accounts to Customer Billing Relationships Database 200.

Account Update Interface 220 creates and posts Customer Billing Relationships Database transactions from the Service Order Activity Files 218 provided by Service Order Extract Interface 216. Account Update Interface 220 selects service order records needed to maintain accounts already on Customer Billing Relationships Database 200 (e.g., disconnect orders, change of billing or service address, package subscription changes, transfers, and number changes) and records needed to establish new accounts (e.g., new orders containing packages, change orders which add a package, new orders that bill a new account to an account number already in Customer Billing Relationships Database 200, and change orders that bill an account on Customer Billing Relationships Database 200 to a new account). The selected service order records are formatted into transactions and posted to Customer Billing Relationships Database 200. Account Update Interface 220 executes on one of the application or database servers.

Package Manager Interface 222 gives Customer Billing Relationships Manager 100 access to additional package information, such as components, English descriptions, and pricing. Customer Billing Relationships Manager 100 uses this information to support customer related package inquiries.

Customer Package Extract Interface 224 provides Bill Calculate 108 with the package subscription information needed to properly price, discount, and allocate revenue to a package. Changes to a package or to its specific terms in the middle of a billing period affect the way usage is qualified and priced. To identify affected packages, this interface selects a set of customer accounts and their requisite package information based on the billing period in which they bill. The package information, e.g., accounts, packages charge numbers, and effective dates, are written to a file and uploaded to the mainframe via a data communications link.

The Customer Billing Relationships Manager architecture also includes external systems that update Customer Billing Relationships Manager 100 with current information. CRIS Studies 204 forwards an extract of currently identified account relationships to Customer Billing Relationships Manager 100. BRIS 208 forwards an extract to assist in creating customer views and account relationships for business customers. ICD 206 forwards account relationships for all COU customers. CRIS 104 edits and posts all service order and miscellaneous account activity to a CRIS Account Database (not shown), and Customer Billing Relationships Manager 100 either makes a copy of the file created by the posting or asks CRIS 104 to create a copy. CRIS 104 also accepts input that does not come from service order activity, e.g., CRIS 104 enables input to correct or adjust account information without having to generate a formal service order form.

Customer Terms and Conditions Manager

Figure 3A:
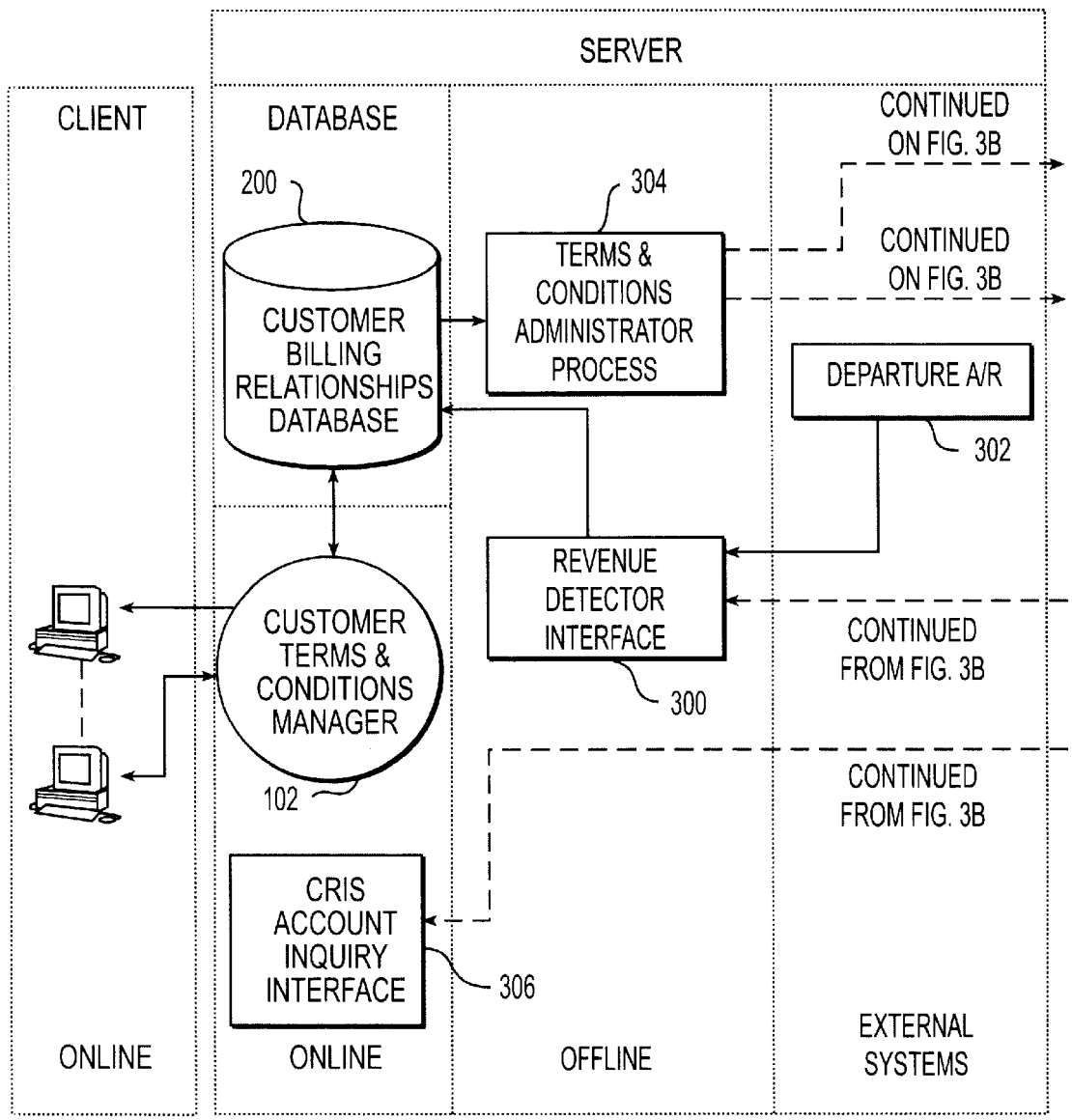
FIG. 3A and 3B are diagrams of the Customer Terms and Conditions Manager business application architecture, showing its online functions, offline functions, and its interfaces and relationships with other applications and systems.
Figure 3B:
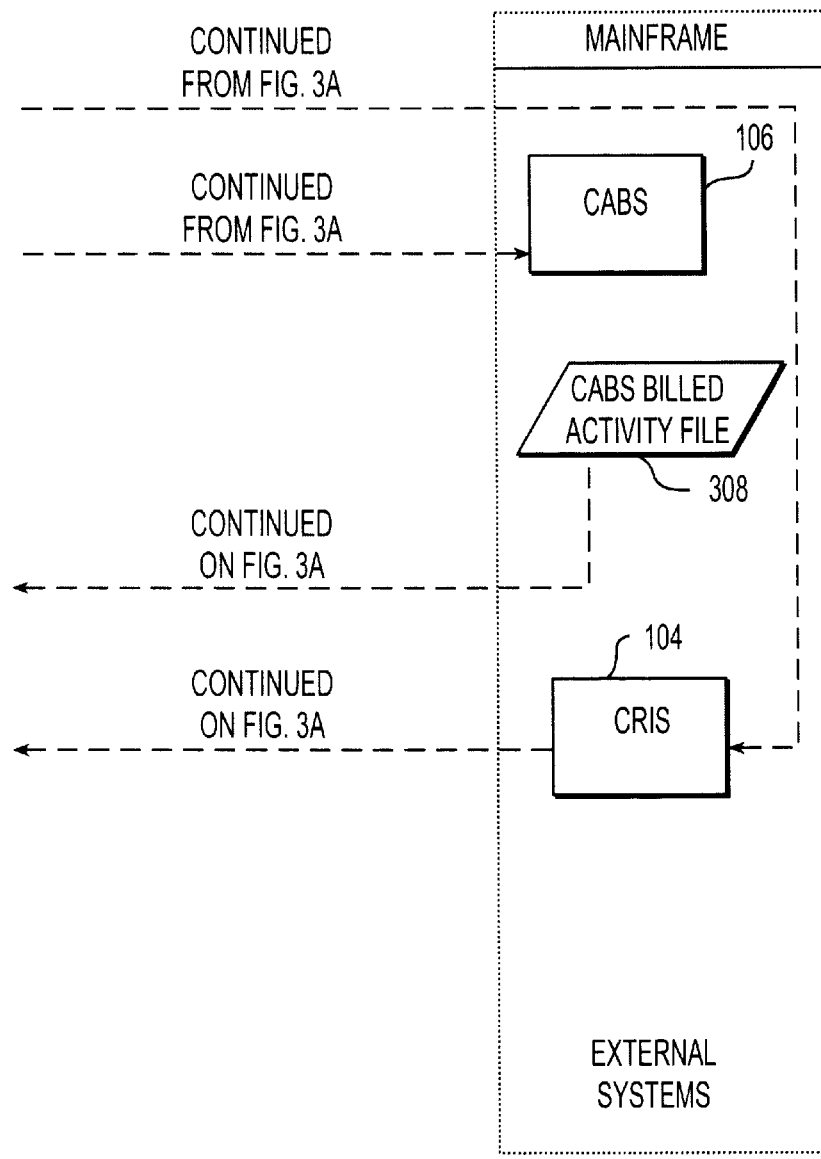

As shown in FIGS. 3A and 3B, the Customer Terms and Conditions Manager architecture is integrated with Customer Billing Relationships Manager 100 and includes online and offline transaction capabilities and an internal monitoring functionality capable of triggering both online and offline activity. Customer Terms and Conditions Manager 102 provides GUIs to support transaction processing and inquiry capabilities. In the preferred embodiment of the present invention, the GUIs are written in SmallTalk™ and communicate with an application server located on a UNIX system to perform business logic, to access current systems data via a communications link, and to provide database access.

Customer Billing Relationships Database 200 is the database for Customer Terms and Conditions Manager 102, as described under the heading "Customer Billing Relationships Manager." However, Customer Billing Relationships Database 200 contains a set of tables specifically developed to support and store the customer contract information required by Customer Terms and Conditions Manager 102, e.g., contract definition, contract terms and conditions, contract revenue, contract terms and conditions reference/rules, contract bill messages, and contract credits and charges.

With regard to offline facilities, Customer Terms and Conditions Manager 102 provides interfaces that exchange information with other business applications and legacy systems, and a process that initiates and monitors contract activities. A Revenue Detector Interface 300 provides Customer Terms and Conditions Manager 102 with the billed revenue information necessary to maintain customer progress toward contract revenue commitments. The interface collects billed revenue data from CRIS 104 and CABS 106 billed accounts having contracts on Customer Billing Relationships Database 200. The interface summarizes the revenue information by billing account and keeps twenty-four months' worth of revenue information for each billing account. Revenue Detector Interface 300 receives information from two sources: 1) for CABS billing activity, a CABS billing activity file is downloaded; and 2) for CRIS accounts, the information comes from either the billed activity file that Departure Accounts Receivable 302 uses for its load process or a Departure Accounts Receivable Database (not shown). In the preferred embodiment of the present invention, the interface executes on an application server or on the Customer Billing Relationships Database server, uses a C++ program to execute, and executes on a daily basis.

A Terms and Conditions Administrator Process 304 monitors contract terms and revenues to determine when to issue contract review notices, and to calculate and initiate charge and credit transactions. The process also generates reports showing revenue under contract and calculates progress toward a commitment level for inquiry or presentation on a bill. Contract charges and credits are sent to a queue for approval. Once approved, Terms and Conditions Administrator Process 304 generates a file of other-charges-and-credits. Contract bill messages are also triggered online and then generated offline as phrase code other-charges-and-credits. Both sets of transactions are uploaded to the mainframe via a data communications link and then used as input into either CRIS 104 or CABS 106. In the preferred embodiment of the present invention, the process is a C++ program that executes daily on an application server or on the Customer Billing Relationships Database server.

CRIS Account Inquiry Interface 306 retrieves from CRIS Accounts 104 the account information necessary to respond to inquiries and verify the accuracy of the account information. The interface executes within Customer Terms and Conditions Manager 102 when a new contract is established or is under detailed review. In the preferred embodiment of the present invention, CRIS Account Inquiry Interface 306 is an online interface operating through a data communications link to CRIS 104. The Customer Terms and Conditions Manager application server issues a request for a set of account information. Once the account information is returned, the application server forwards the information to the appropriate GUI, which displays the information.

The Customer Terms and Conditions Manager architecture also includes external systems with which it exchanges data to maintain billed revenue information, to issue bill messages, and to generate contract related charges and credits. Customer Terms and Conditions Manager 102 accesses a Departure Accounts Receivable Database (not shown) pursuant to each loading of billing activity from CRIS. CABS 106 provides Customer Terms and Conditions Manager 102 with a billed activity extract for the purpose of maintaining access related contract revenue. CRIS 104 accepts input that does not come from service order activity (e.g., input for account correction and adjustment) and provides Customer Terms and Conditions Manager 102 with the corresponding information. CABS 106 also accepts and reports to Customer Terms and Conditions Manager 102 input that does not come from service order activity (e.g., input for account correction or adjustment); however, the input concerns only charges and credits to be billed in CABS 106. These reports are in the form of CABS Billed Activity Files 308.

Technical Architecture

The technical architecture defines the hardware and system software of the present invention that communicates between components of applications and interfaces between the applications and external systems. The technical architecture is based on a distributed, client/server architecture that supports object oriented technology, messaging, transactions, security, system management, and reporting. It supports a three-tier technical architecture consisting of client systems, UNIX server systems, and enterprise server systems. This three-tier technical architecture provides the platform layer of the architecture and comprises processors and system level software, such as operating systems, databases, and object storage mechanisms.

The architecture of the present invention is composed of separate business applications. In the preferred embodiment, the present invention is comprised of two business applications (as described in detail above), with each containing one or more of the following components: 1) an online portion of the application; 2) a database; 3) standard reports; 4) offline, i.e., batch, interfaces to and from other systems; 5) online interfaces to and from other systems; 6) interfaces updating changes to existing systems; and, 7) interfaces to other business applications. The online component of each application comprises GUIs for an end user to enter, view, and change information and application servers that contain the business logic and data access. Preferably, GUIs reside on client workstations and are written in SmallTalk™, and the application servers, written in C++, reside on mid-range UNIX servers, e.g., Hewlett-Packard™ K420 class systems. Also, preferably the clients communicate with the application servers by using object management software, e.g., Object Request Broker (ORB).

The databases required for the present invention preferably reside on large UNIX servers and provide relational database capabilities, such as those provided by Sybase™.

The online interfaces and offline interfaces of the present invention facilitate the exchange of data between the business applications and other application systems, such as the legacy systems. Offline interfaces pass large amounts of data and execute on a daily or less frequent basis. Online interfaces pass less information more frequently, often at the request of an online user.

In the preferred embodiment, offline interfaces are coded in any suitable business application computer programming language. Preferably, if the present invention runs on a mainframe, the interfaces are coded in COBOL, and if the present invention runs on a UNIX system, the interfaces are coded in C or C++. Any extract files created by the interface programs are preferably transferred using ORB.

In the preferred embodiment, online interfaces use object management software to exchange information between the business applications of the present invention and existing legacy systems. Preferably, the object management software is ORB. Information requests from the legacy systems to the business applications of the present invention are sent in the form of ORB. Upon receipt of the ORBs, the application server of the business application processes the request and returns the appropriate information or response. Similarly, information requests from the business applications of the present invention to the legacy systems are sent via ORB. The business application's server waits for a response from the legacy system and then continues processing. Optionally, the business applications and legacy systems could perform these information exchanges asynchronously.

In the preferred embodiment, the present invention also provides means for information exchange between the business applications. Specifically, the present invention uses an object management system or object management software to facilitate communication between applications. Preferably, online interfaces between business applications communicate using ORBs. The present invention uses ORB to communicate between two separate architectures.

Figure 4:
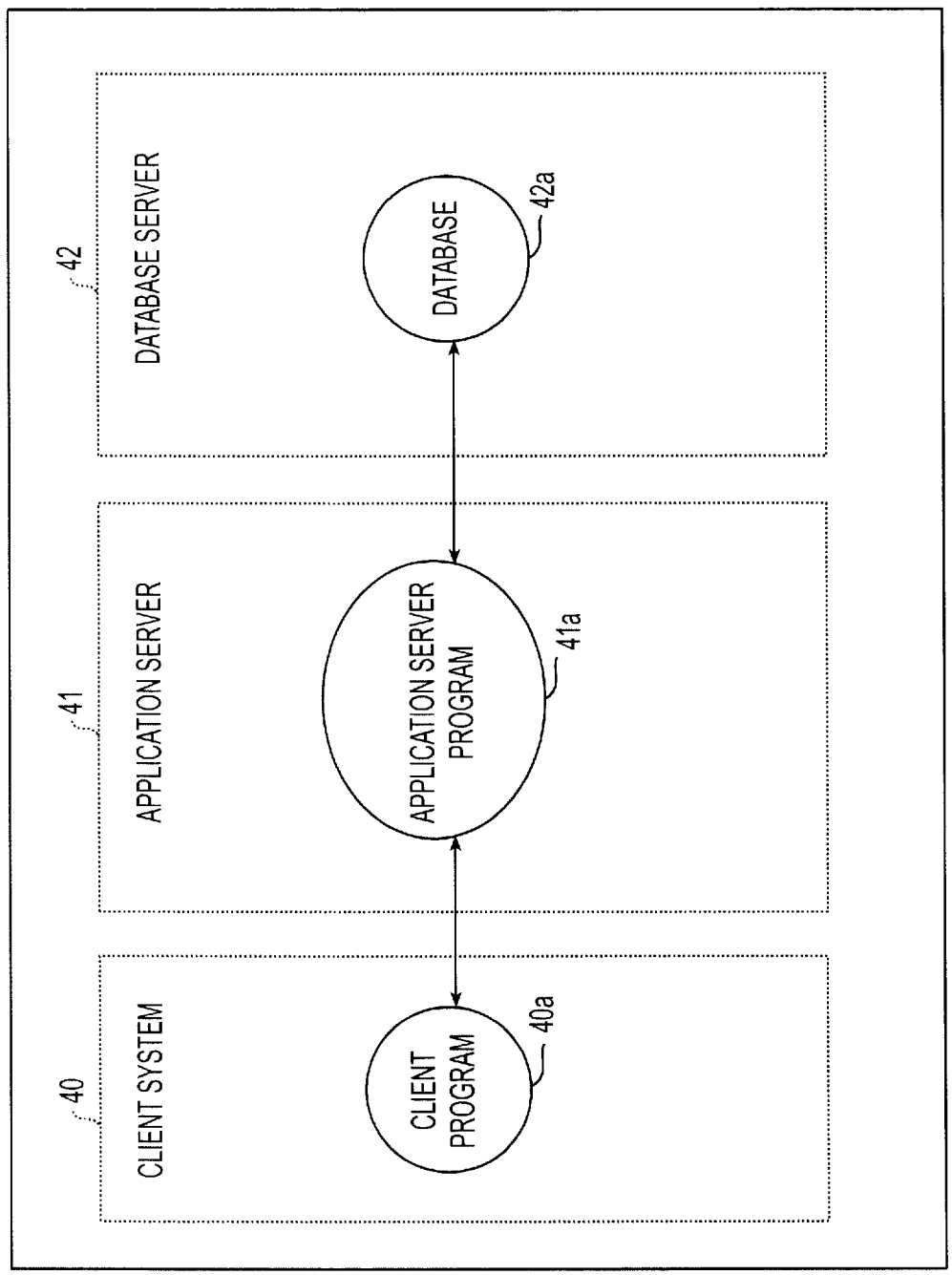
FIG. 4 is a schematic diagram of the three-tier technical architecture of the present invention.
Figure 6A:
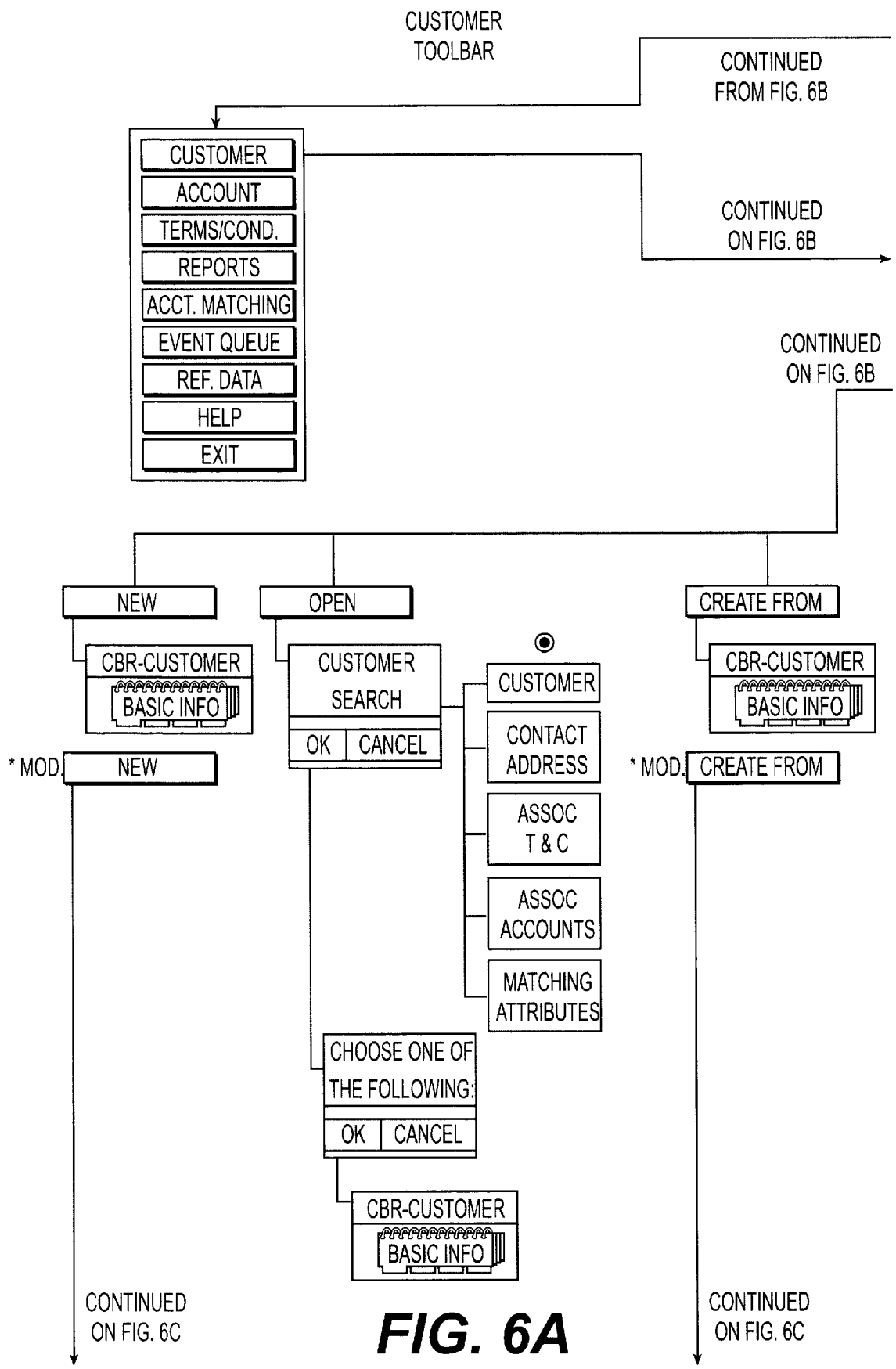
FIGS. 6A–6C are diagrams of a customer toolbar workflow through which a Telco creates a customer.
Figure 6B:
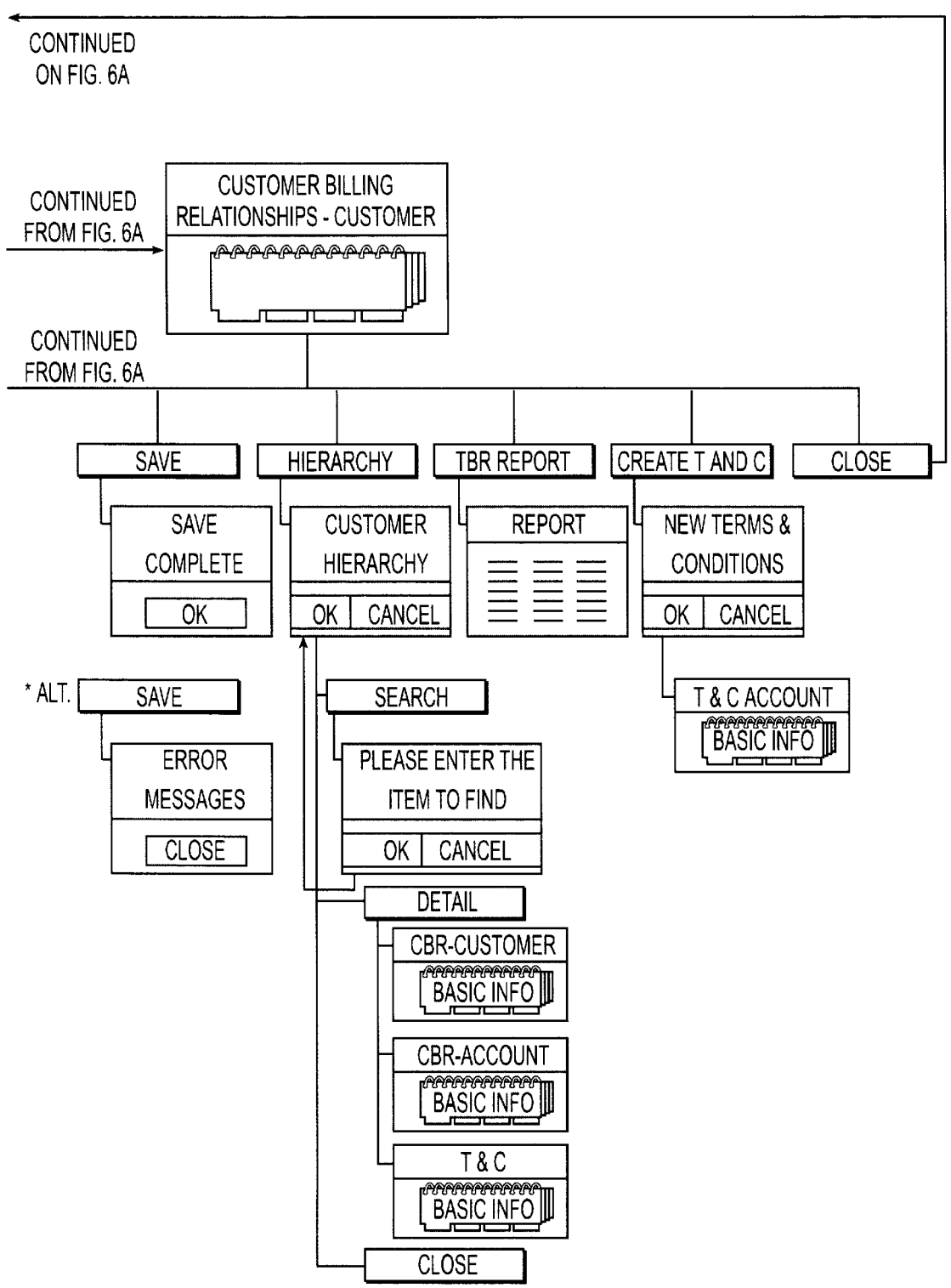
Figure 6C:
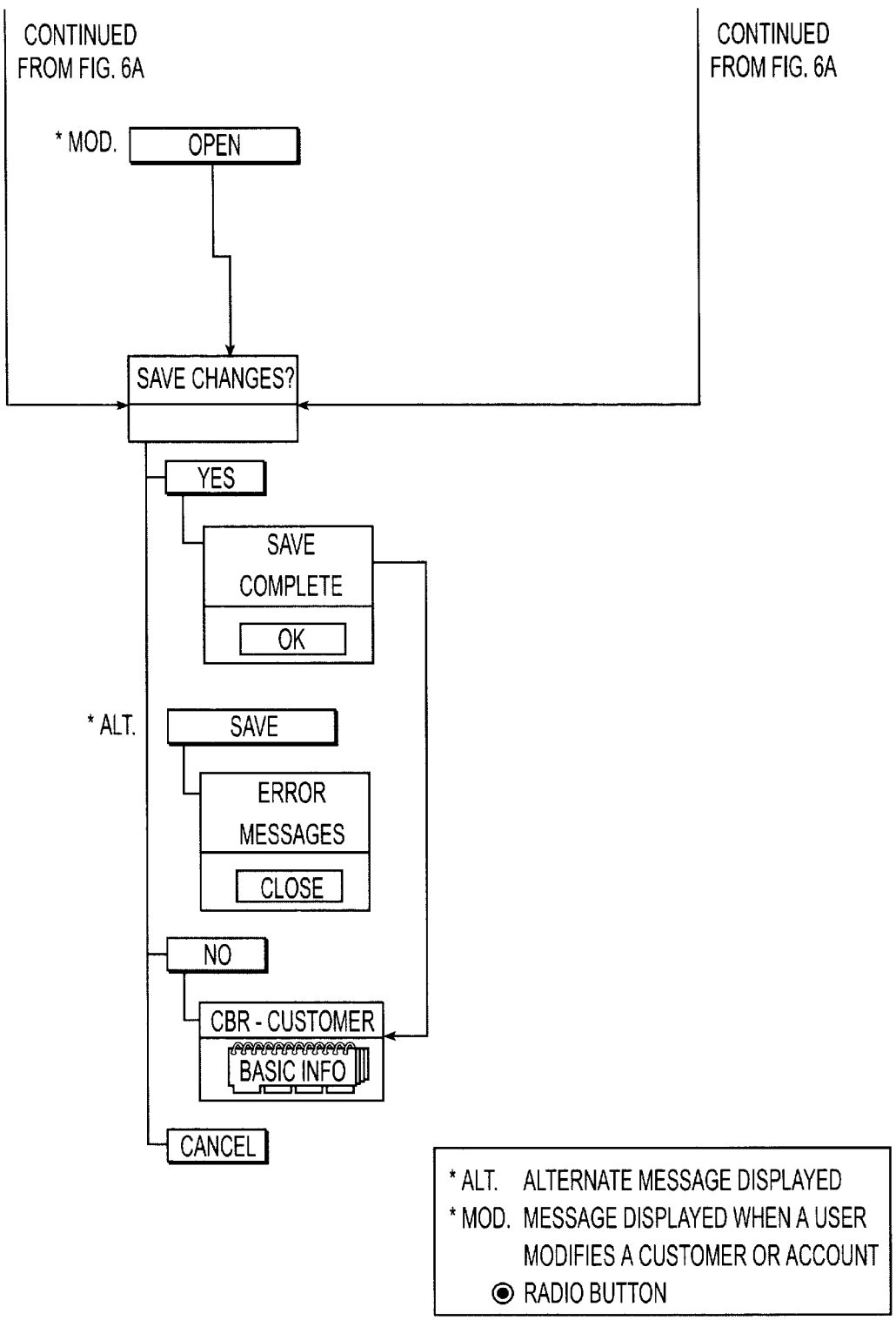
Figure 7A:
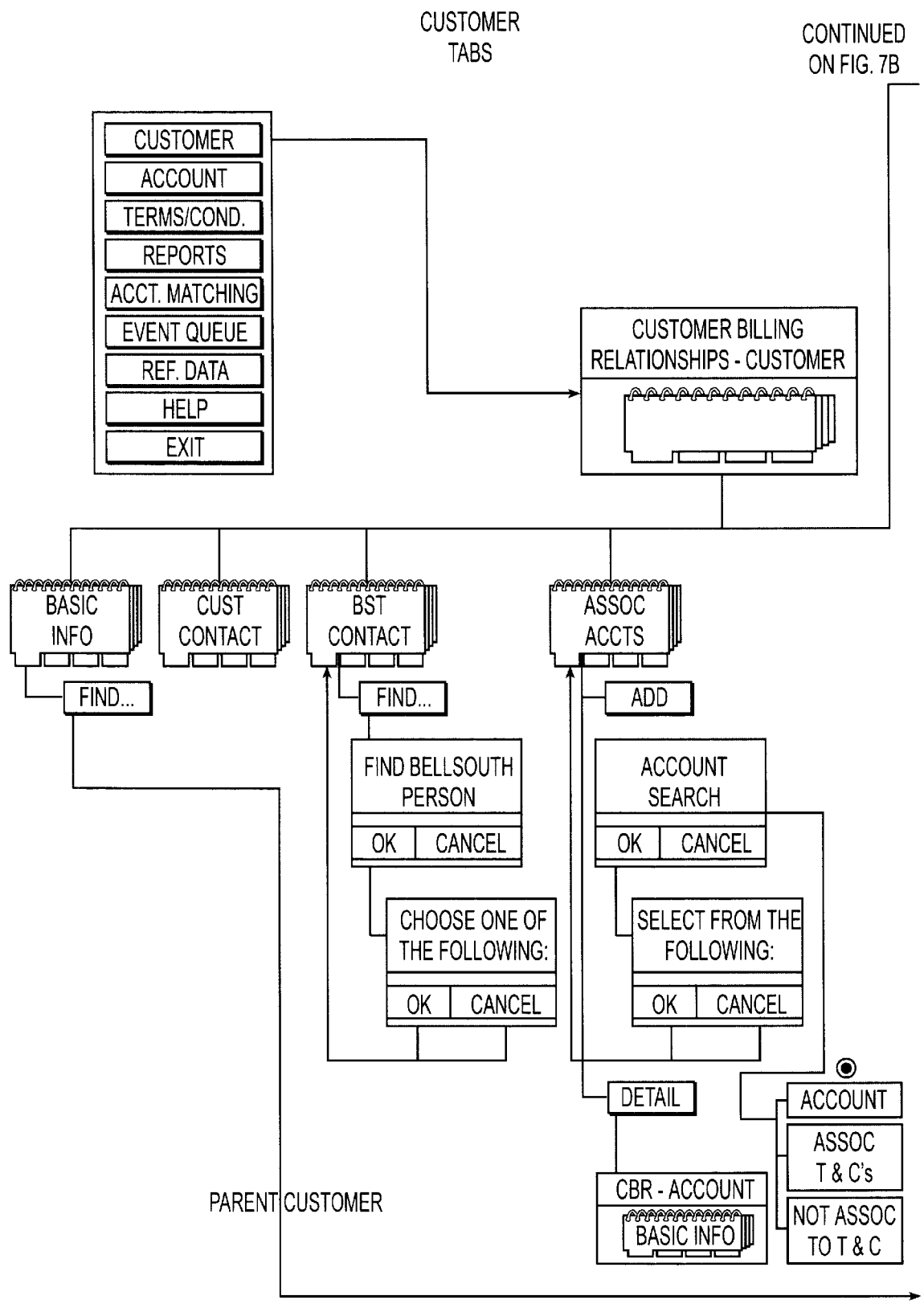
FIG. 7A and 7B are diagrams of a customer tab workflow through which a Telco creates a customer.
Figure 7B:
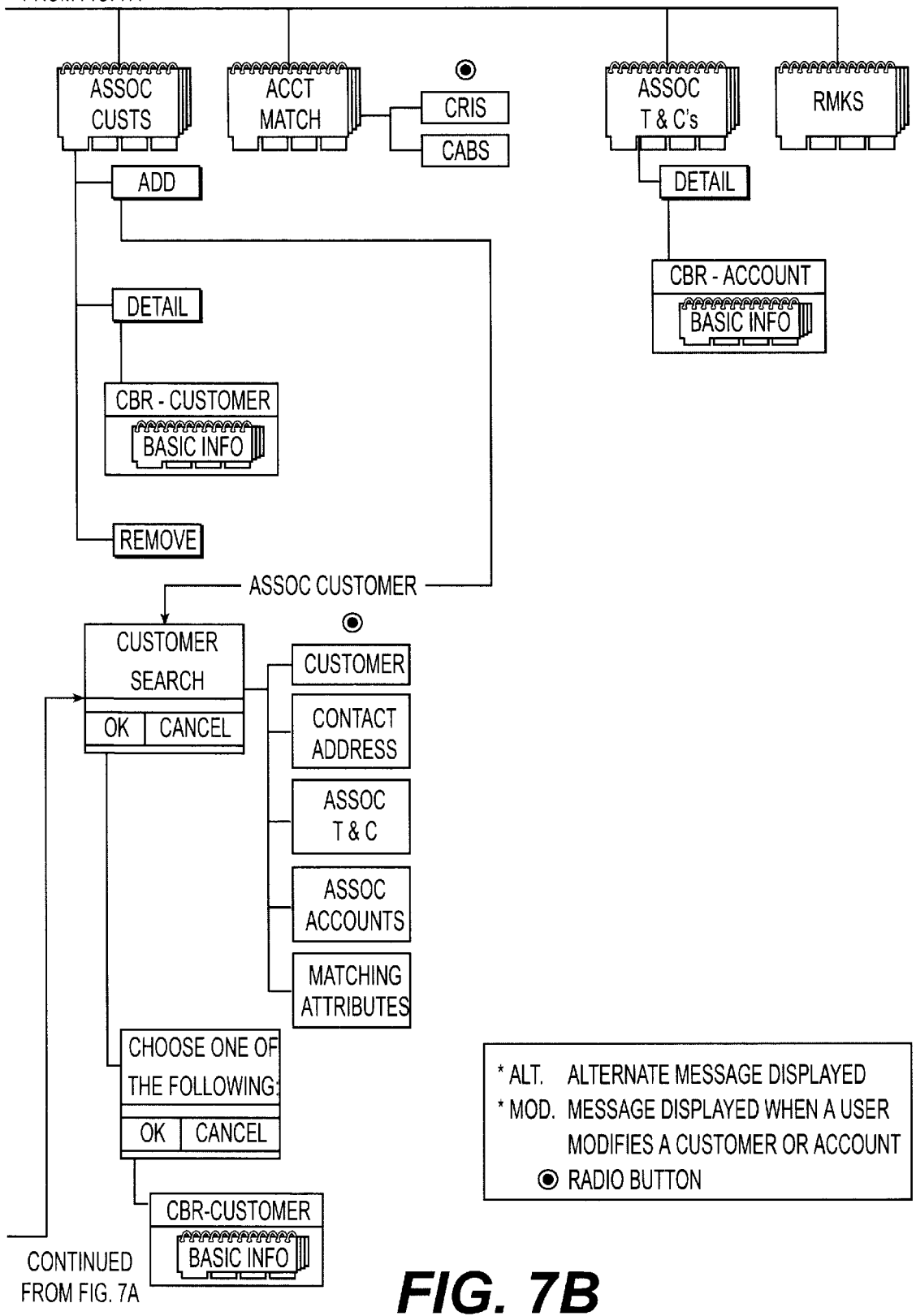
Figure 9A:
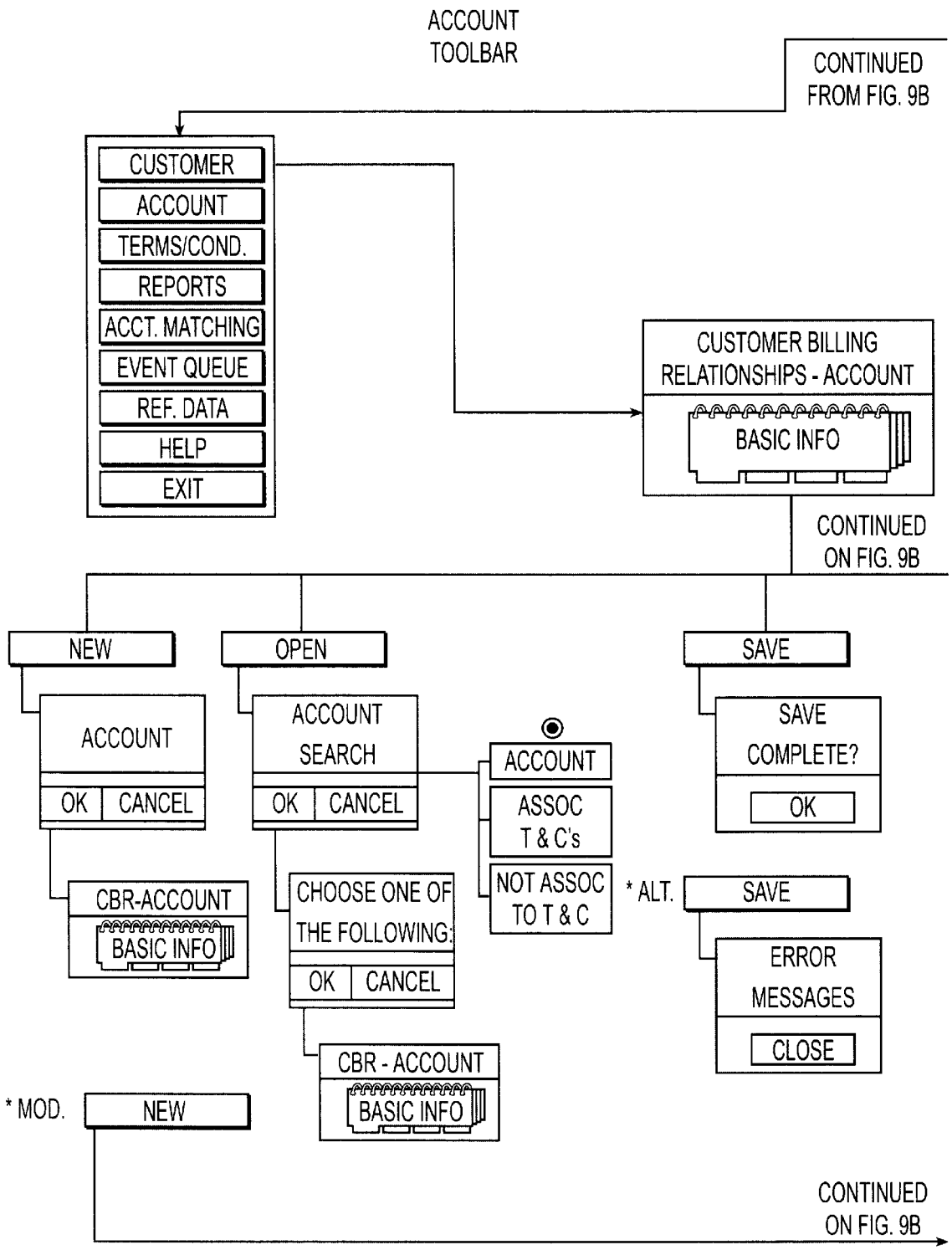
FIGS. 9A and 9B are diagrams of an account toolbar workflow through which a Telco creates an account.
Figure 9B:
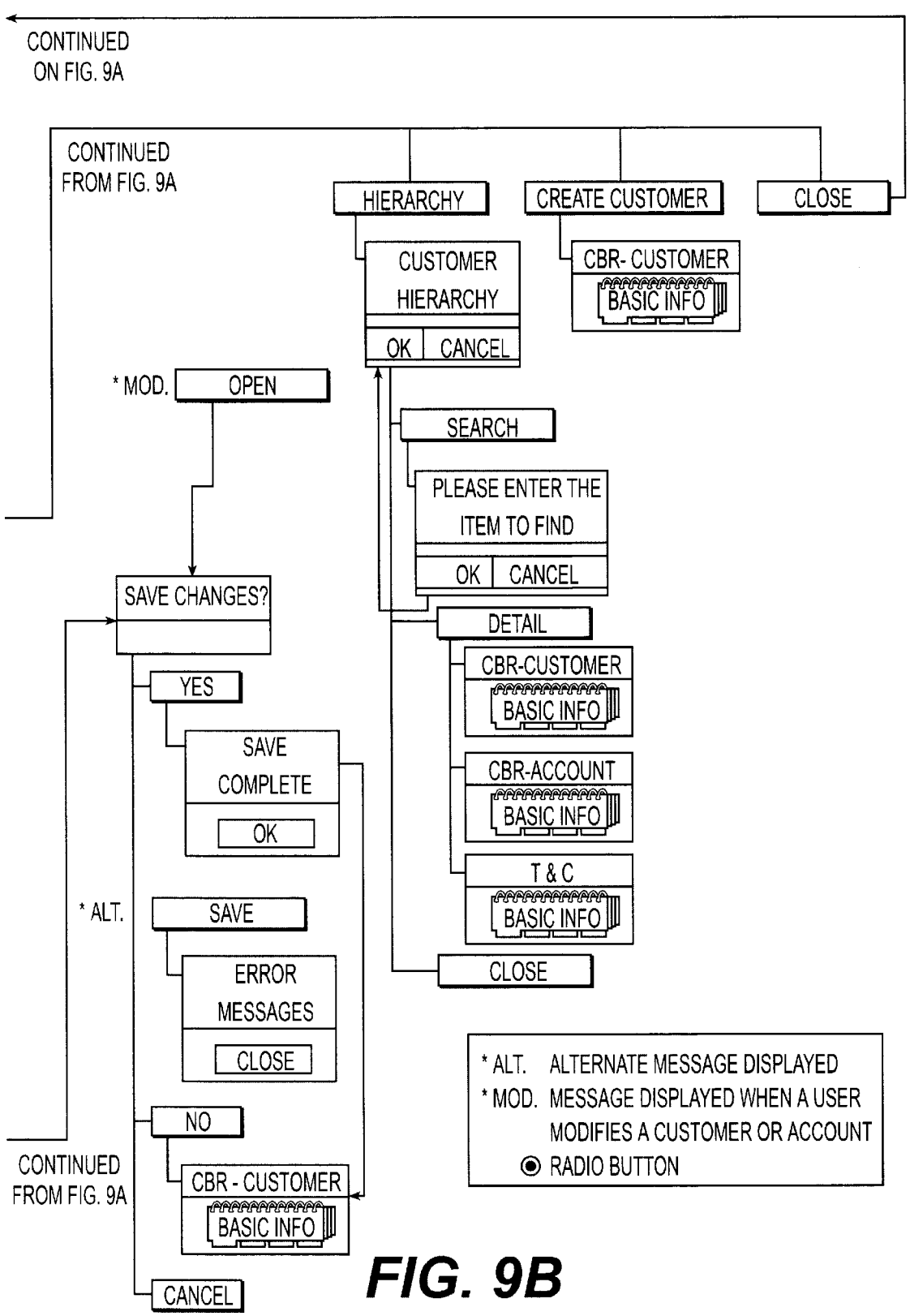
Figure 10A:
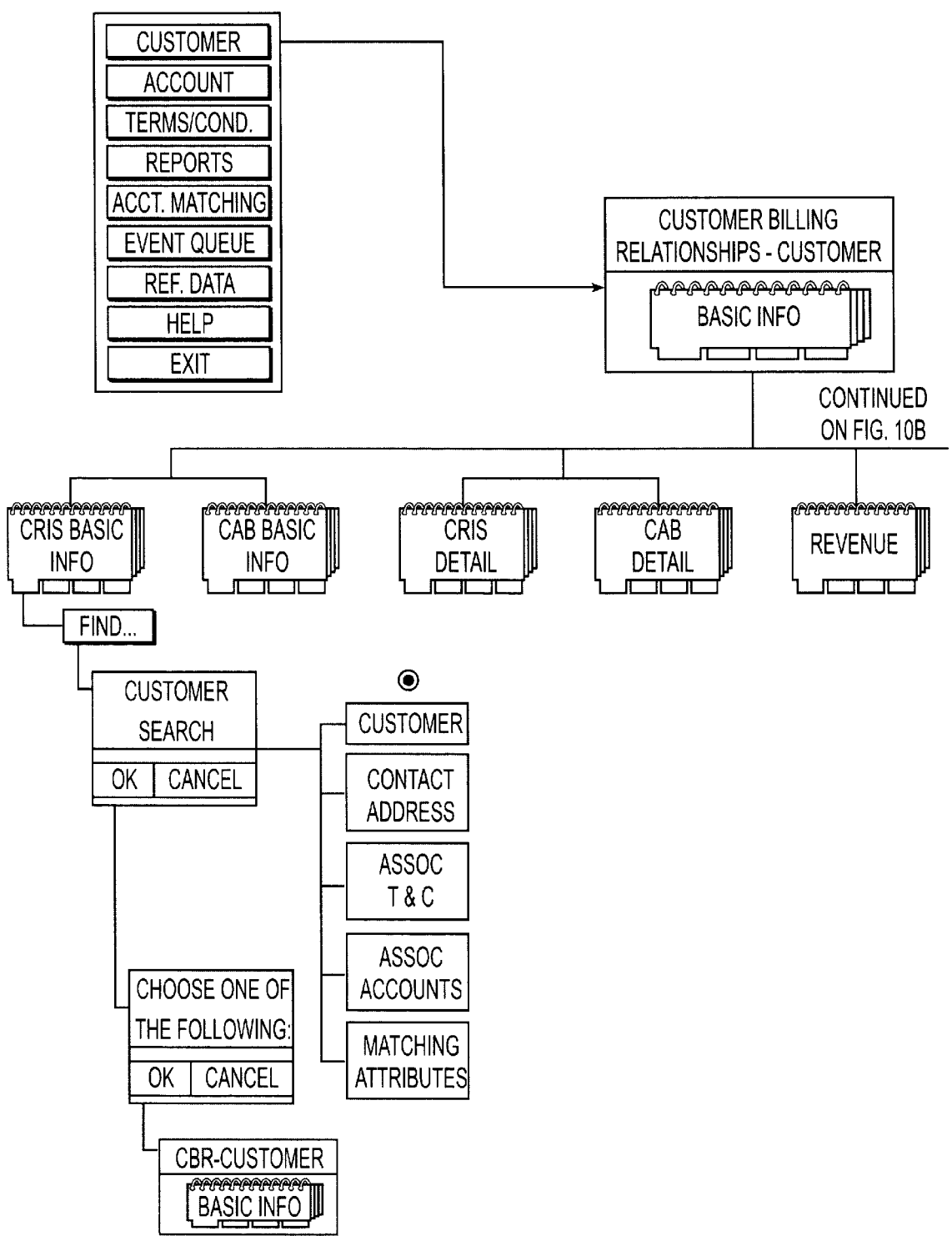
FIG. 10A and 10B are diagrams of an account tab workflow through which a Telco creates an account.
Figure 10B:
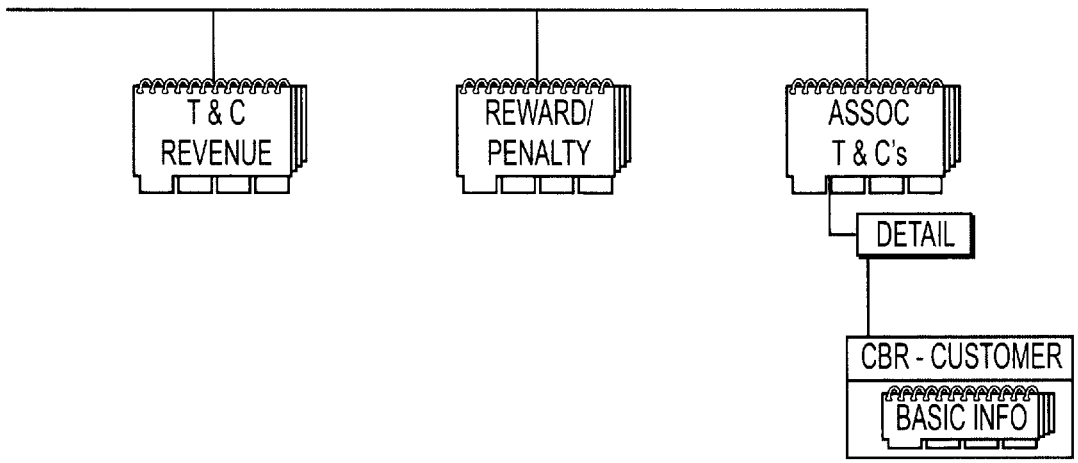
Figure 12A:
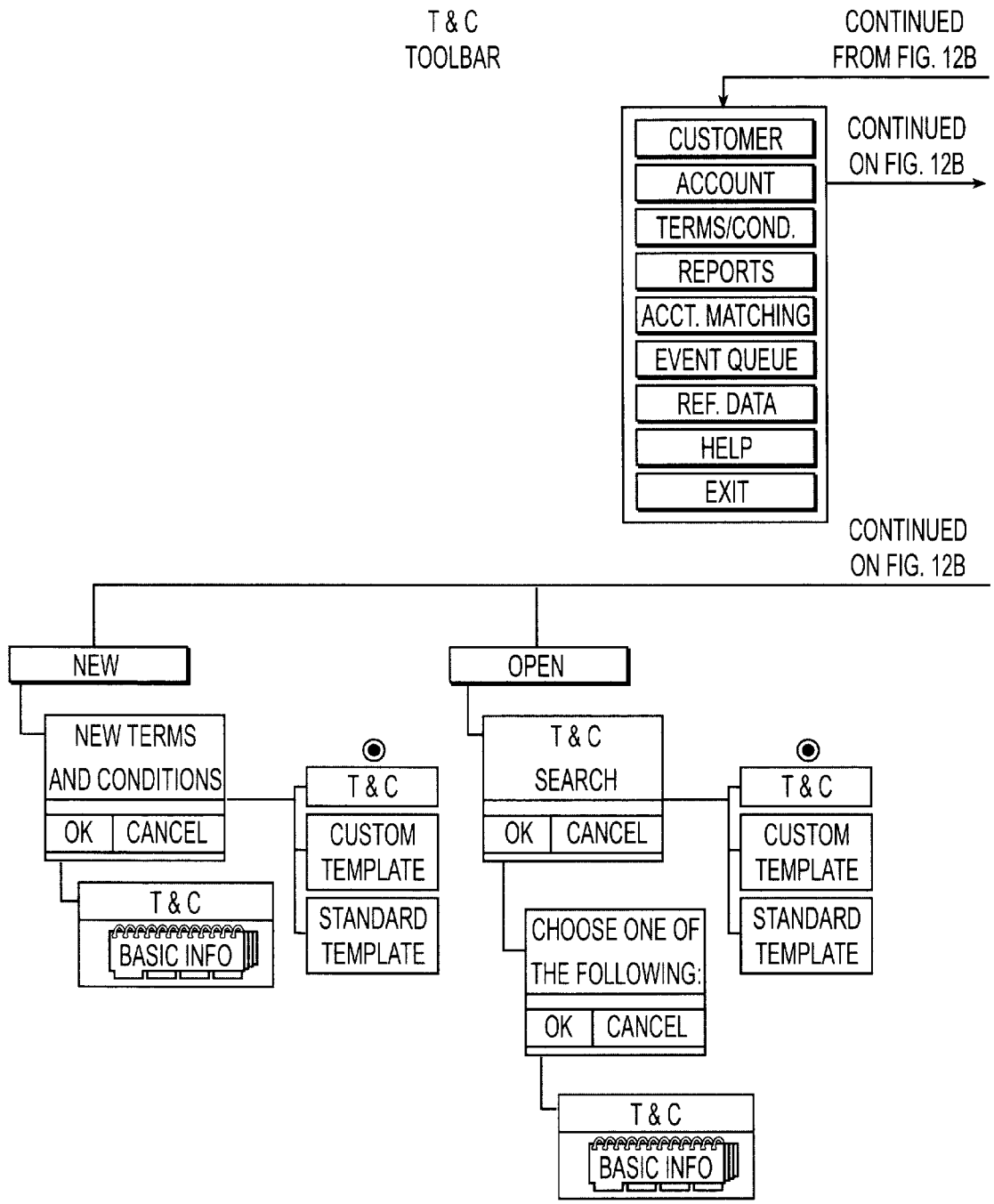
Figure 12B:
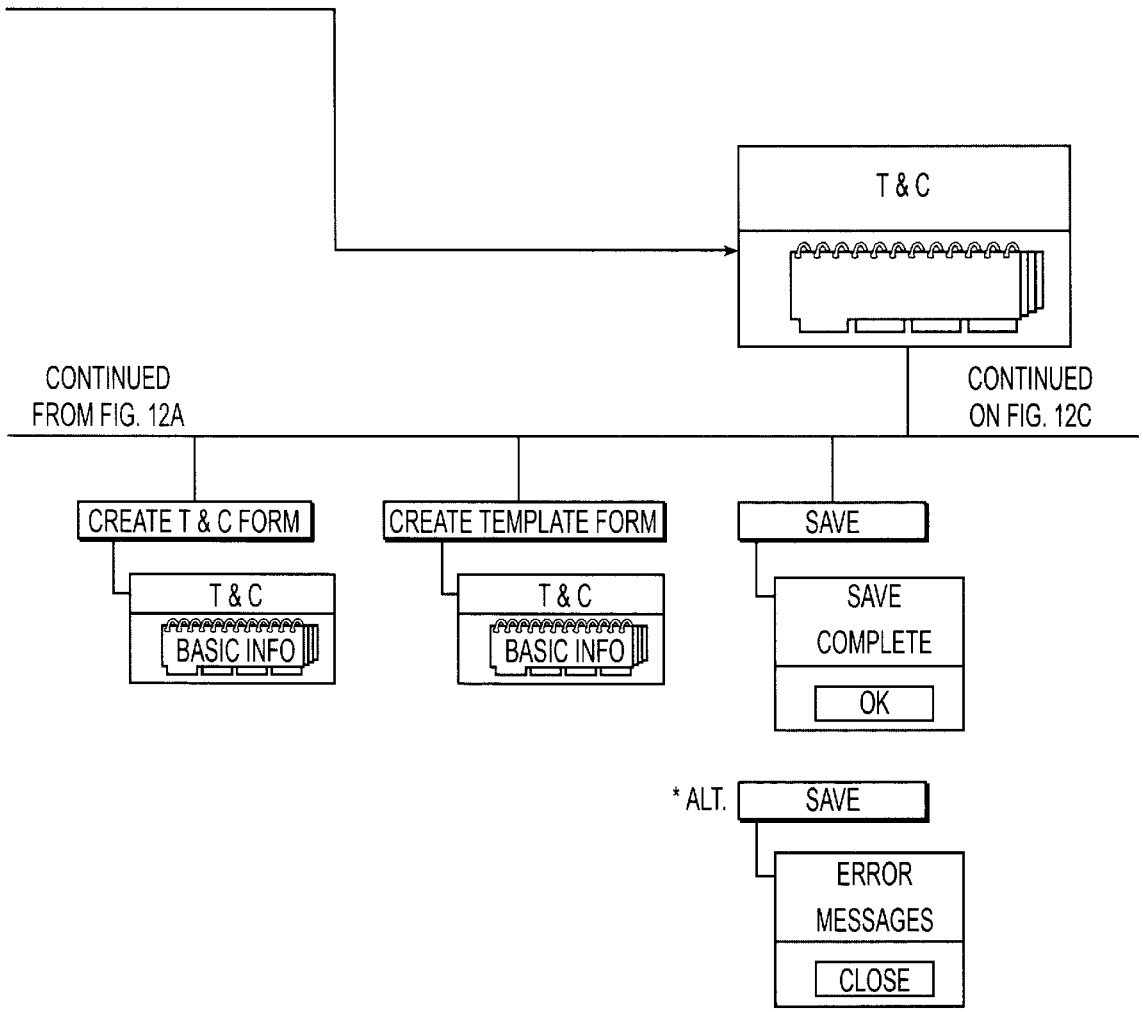
Figure 12C:
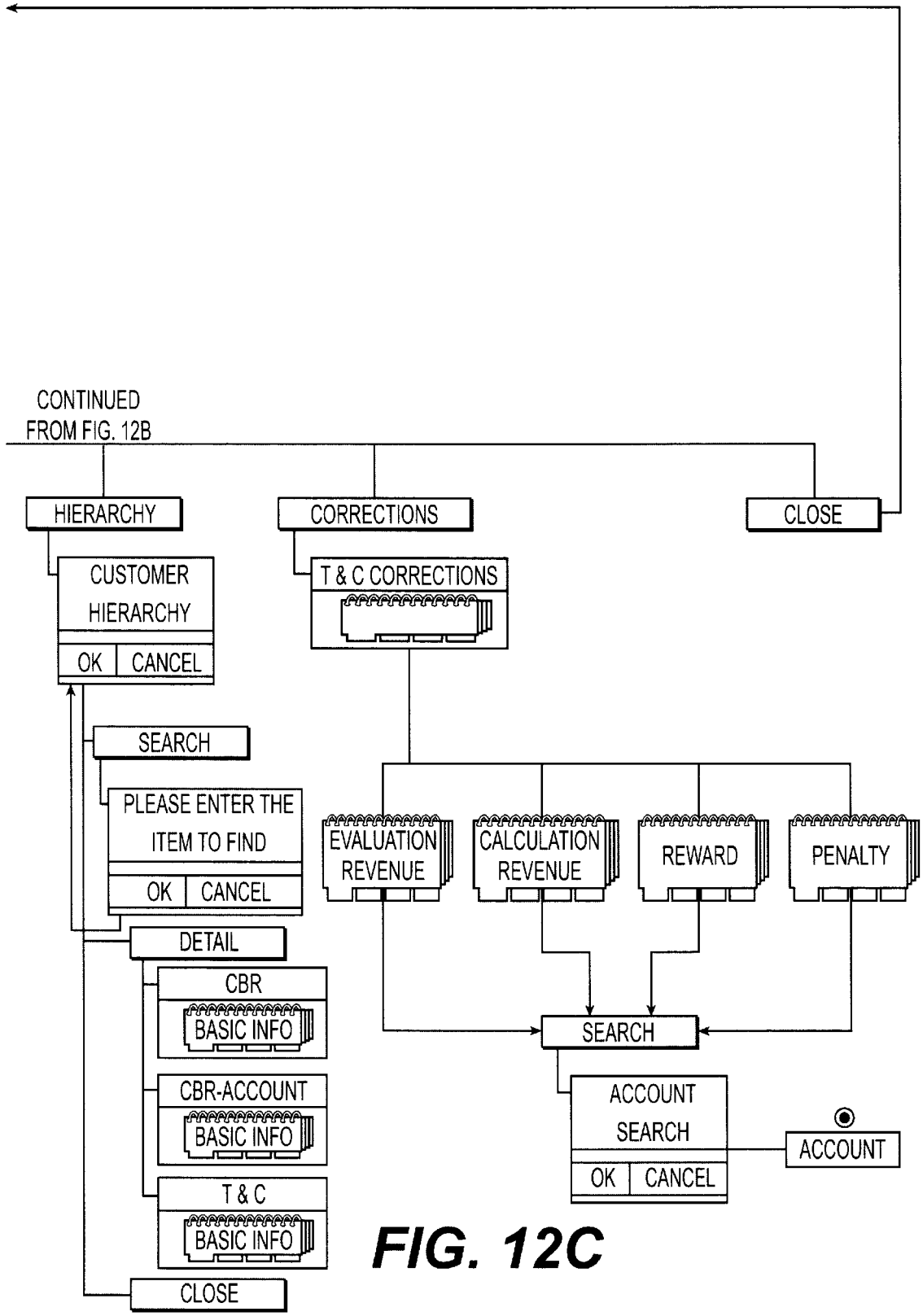
Figure 12D:
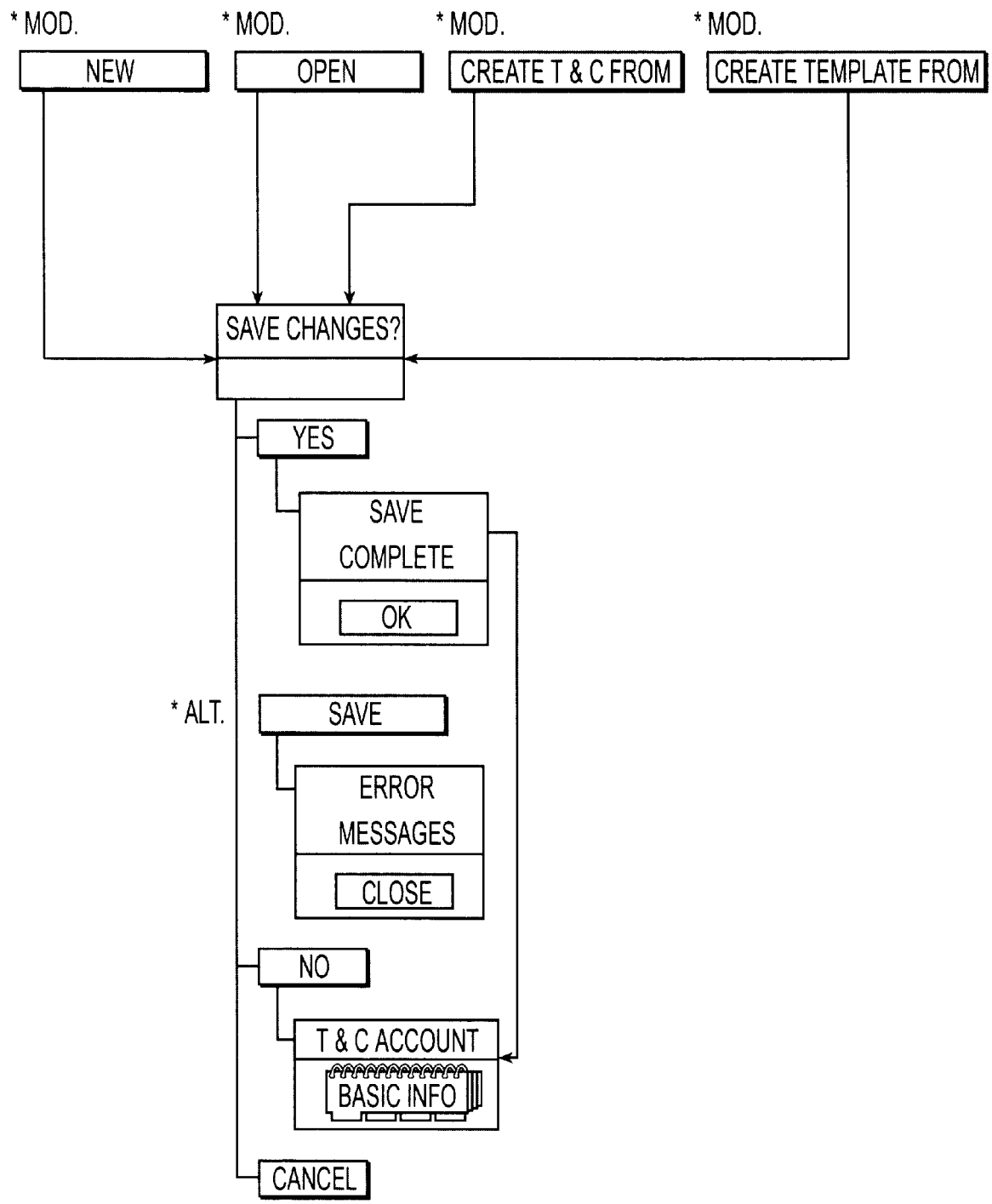
Figure 13A:
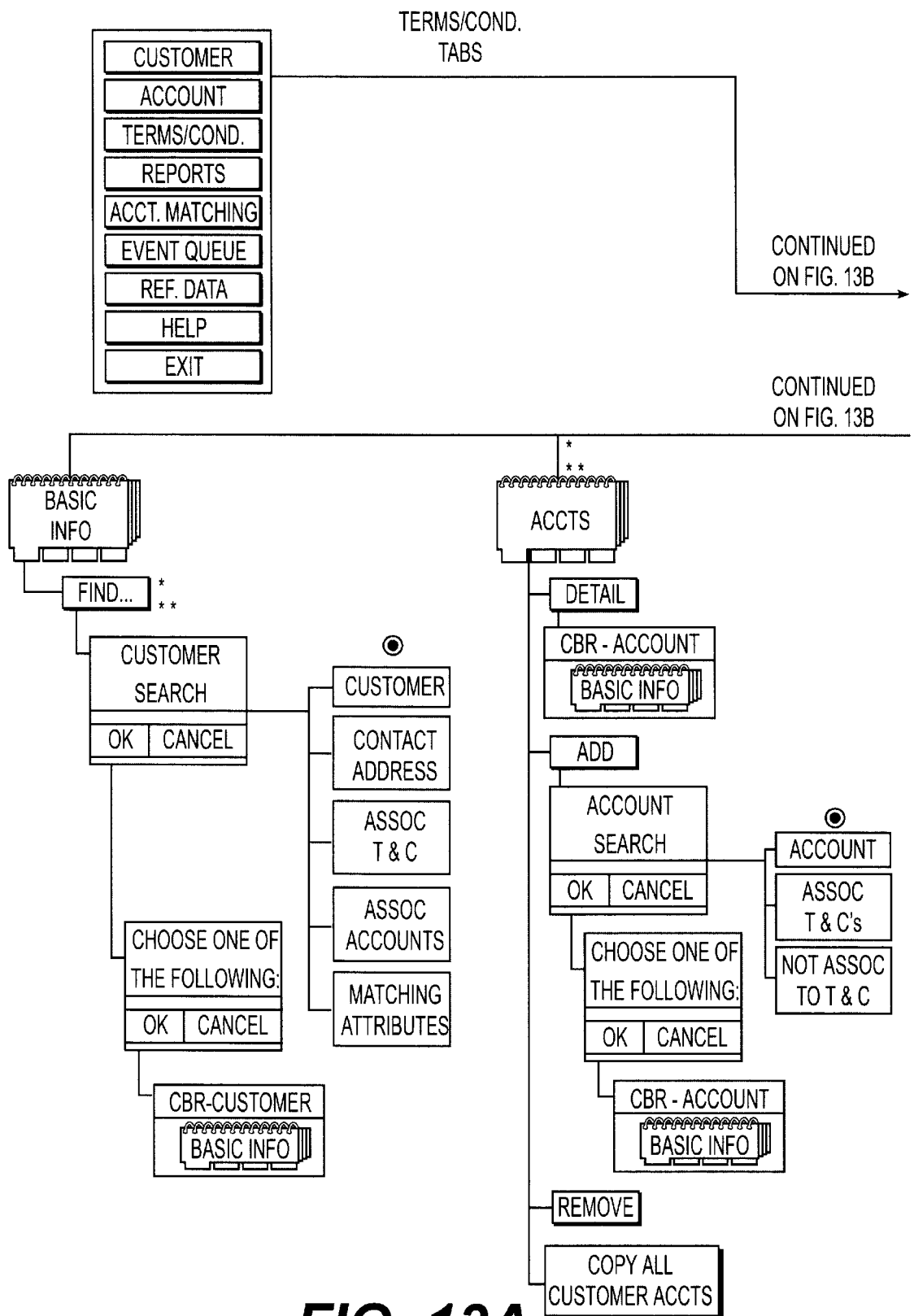
Figure 13B:
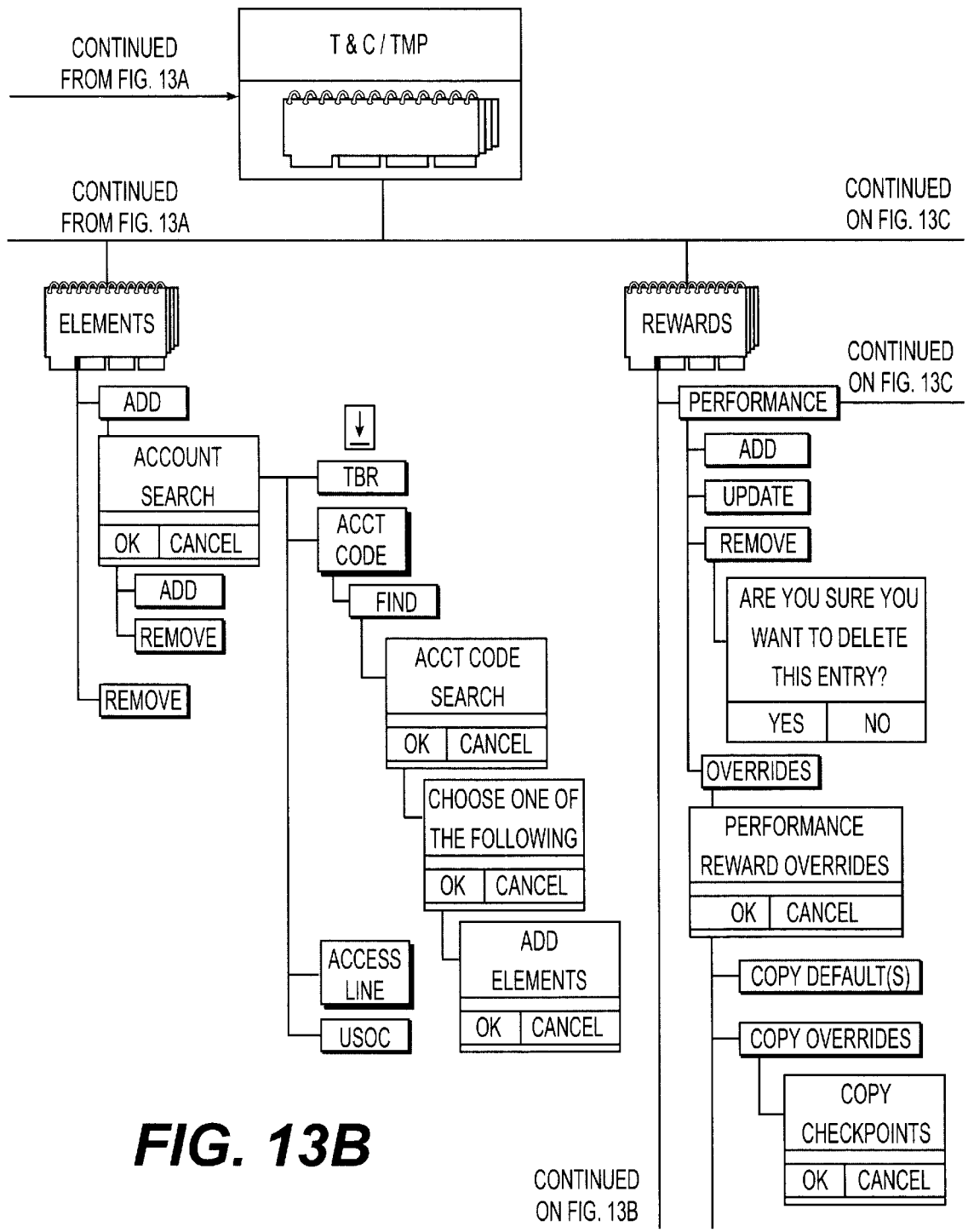
Figure 13C:
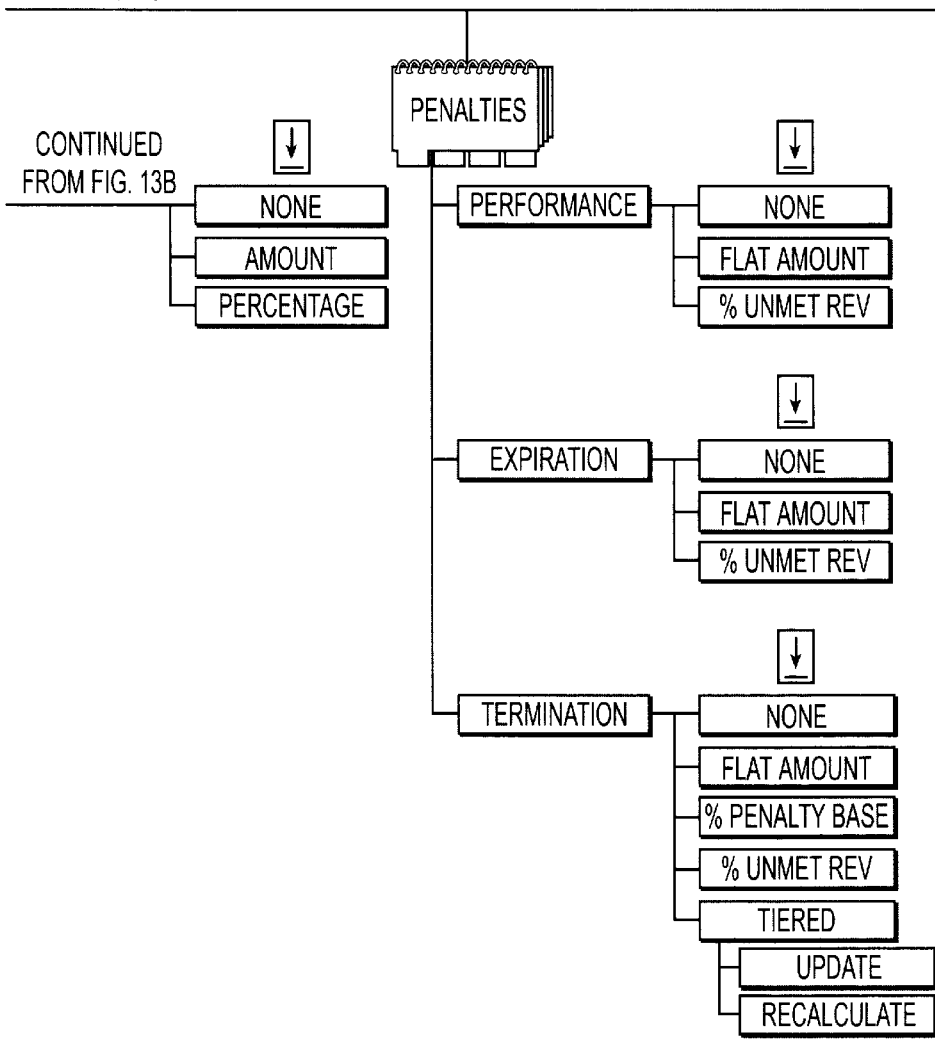
Figure 13D:
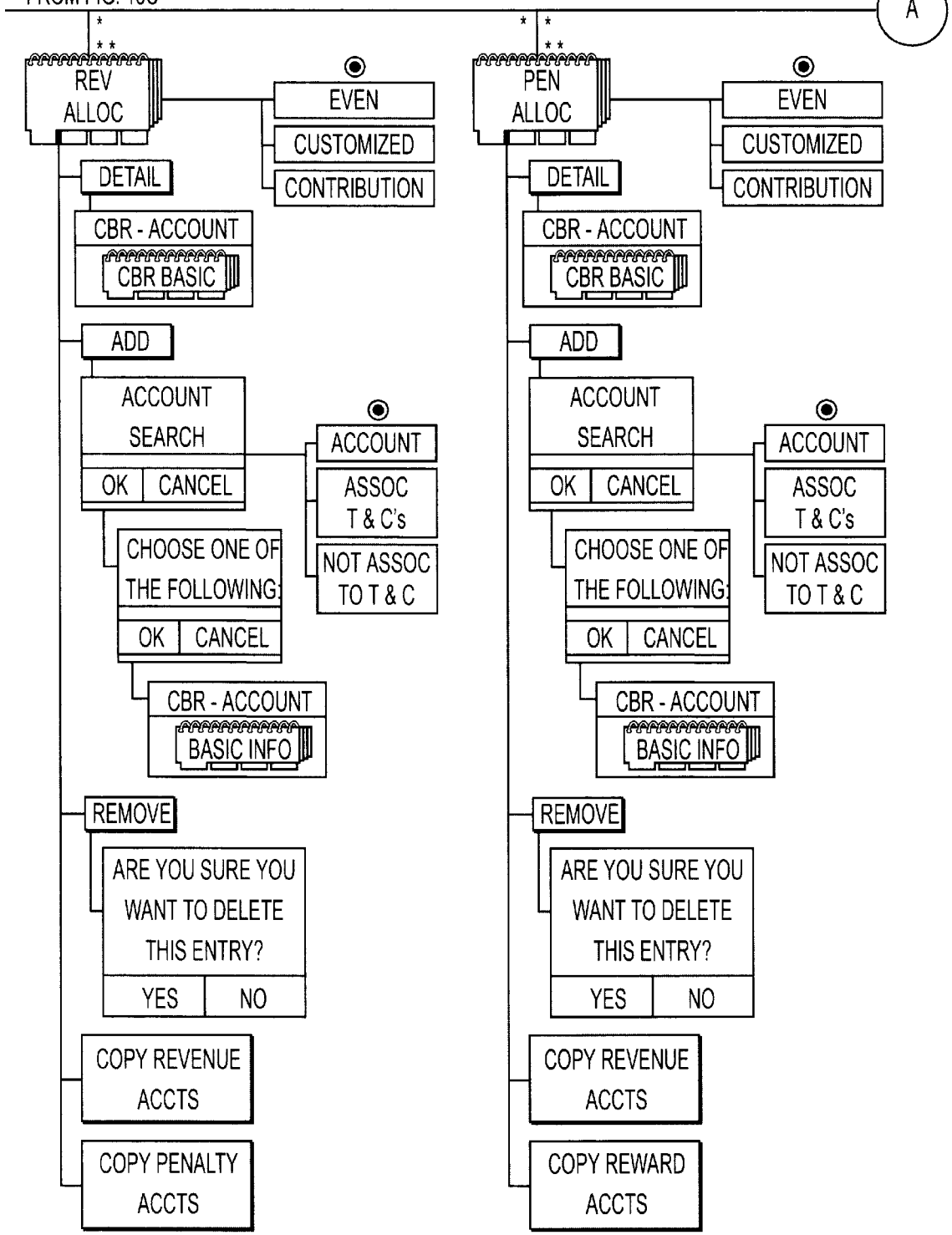
Figure 13E:
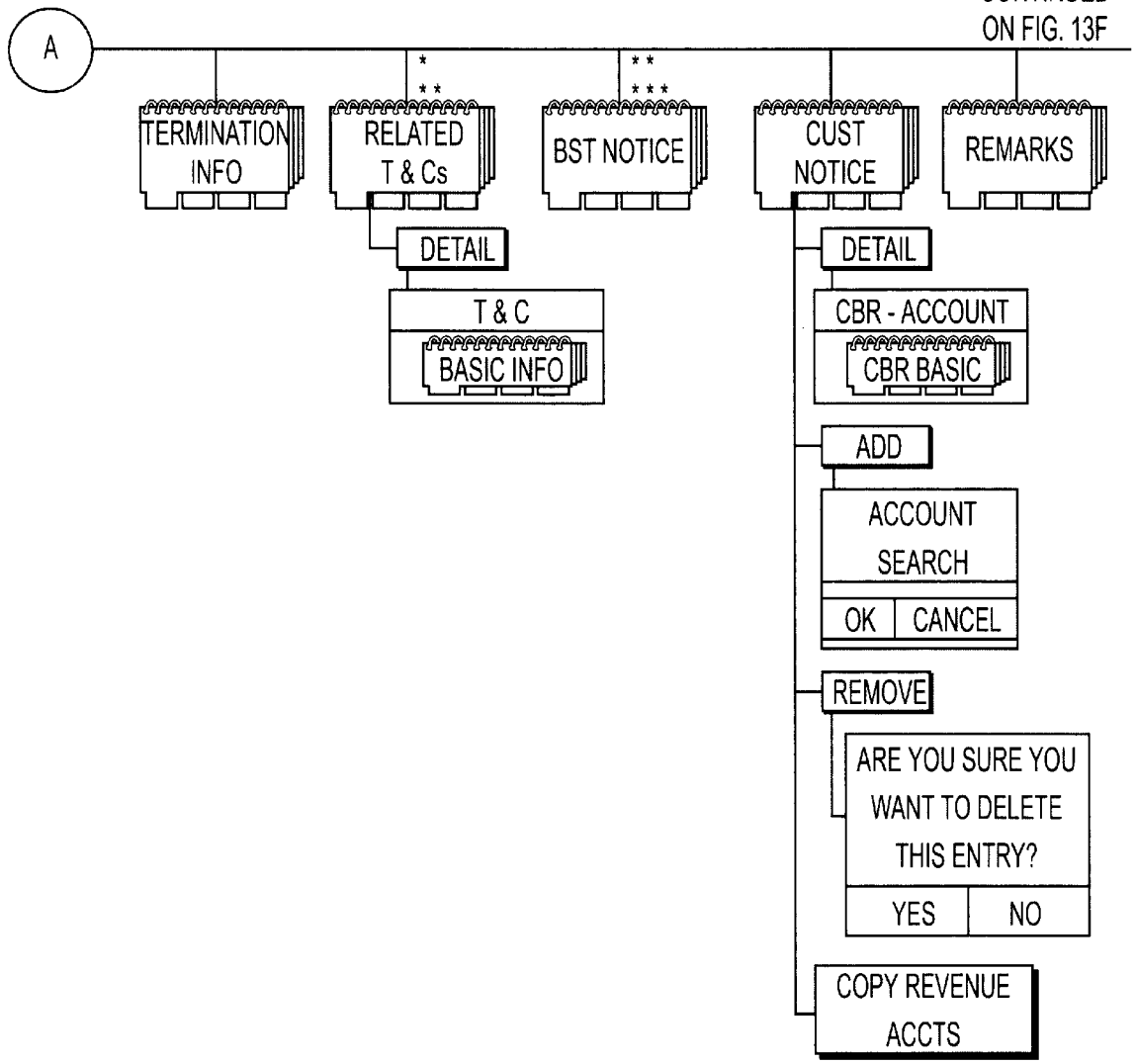
Figure 13F:
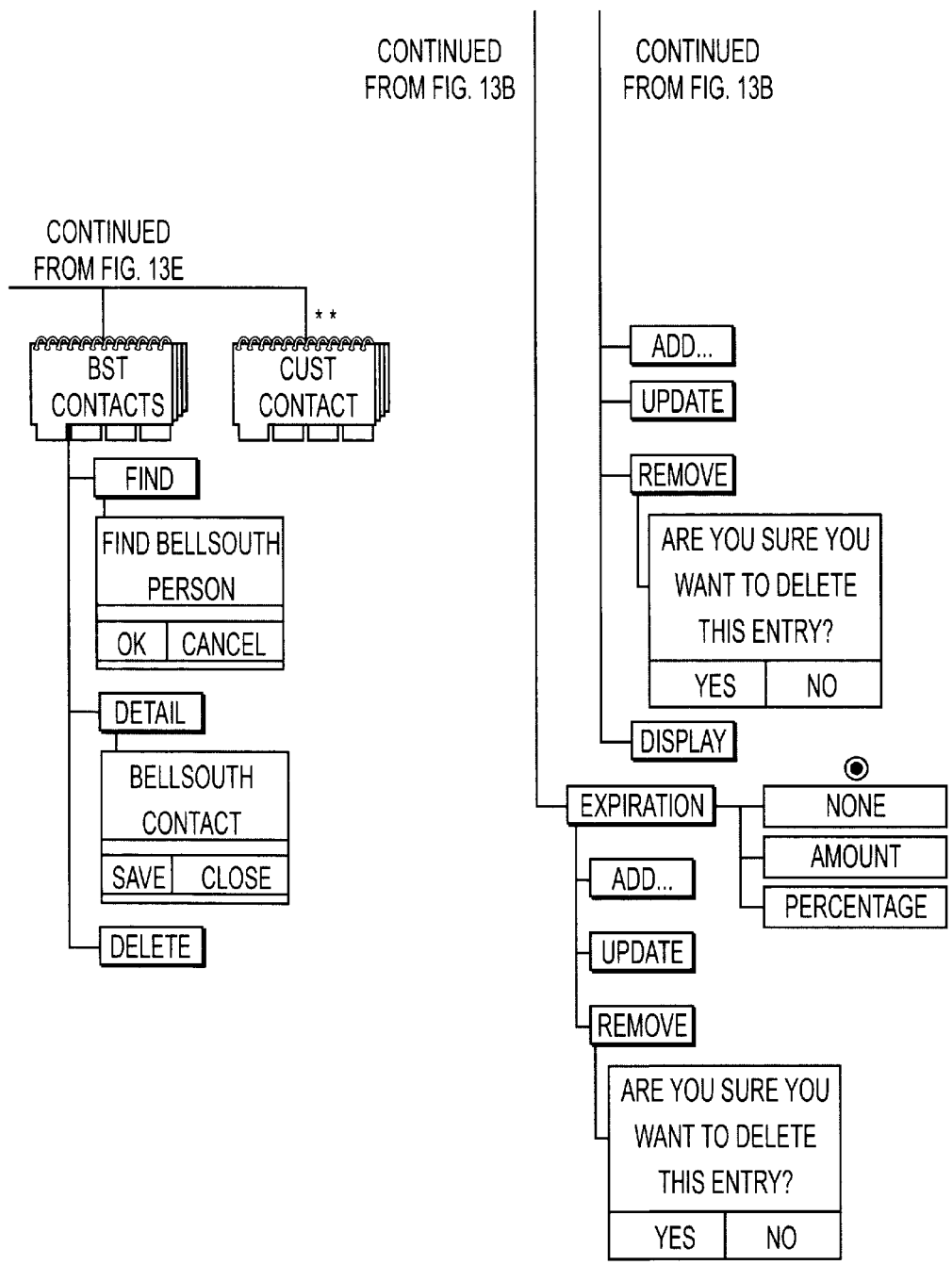

As shown in FIG. 4, the online portion of the present invention is built on a three-tier architecture comprising three components: a client system 40, an application server 41, and a database server 42. Preferably, client system 40 is a personal computer or workstation that provides a graphical user interface, and application server 41 and database server 42 are multi-user computer systems, e.g., UNIX-based servers. FIG. 4 is a simplified illustration of the three-tier architecture. However, it should be understood that multiple client systems and programs might be distributed throughout a network. Furthermore, several application servers running multiple applications may be located at various places, and multiple database servers and databases may be distributed as well.

Within this three-tier architecture, the components have the following functions. Through client system 40, a user requests information from an application server program 41a running on application server 41. Application server program 41a retrieves the information from database 42a residing on database server 42, performs any required business logic, and returns the information to the requesting client program 40a. Client program 40a then formats and displays the information on a screen for the user.

In the preferred embodiment, an application server runs multiple application server programs and interfaces with multiple programs and systems. Thus, this preferred embodiment requires fewer application servers. This strategy enhances the maintainability of the system and increases the flexibility to distribute application code across physical platforms. Also, by using fewer application servers, less software has to be distributed for new releases. Additionally, if business logic or data sources change, modifications to the client programs are not necessarily required to accommodate the changes.

The three-tier architecture also has the advantage of enabling the asynchronous processing of requests from the client GUI. Thus, a user can make a request, move on to other tasks while the application server processes the request, and check back later to obtain the results. This advantage is particularly helpful with requests that require the reading of large amounts of data, the computing of many programs, or the accessing of several external systems.

EXAMPLE

FIGS. 5–13G are a series of GUI screens, toolbar menus, and tab menus that illustrate an example of the workflow of the present invention. While the method and system described herein and illustrated in the figures contain many specific examples of program steps, these program steps should not be construed as limitations on the scope of the invention, but rather as an example of one preferred embodiment thereof. As would be apparent to one of ordinary skill in the art, many other variations on the system operation are possible, including differently grouped and ordered method steps. Accordingly, the scope of the invention should be determined not by the embodiments illustrated, but by the appended claims and their equivalents.

FIG. 5 is a picture of an initial customer screen through which the Telco creates a customer. Populating the data entry fields in this GUI creates the customer account. FIGS. 6A–6C and 7A and 7B illustrate the subsequent series of GUIs the Customer Billing Relationships software presents to prompt a Telco account administrator for customer information. Following the menus and prompts, the account administrator can identify such information as the name of a customer, the number of accounts (telephone numbers) associated with a customer, the amount of revenue the Telco has earned from a customer, and the terms and conditions that apply to a customer's billing plan. Following the workflow shown in FIGS. 6A–6C and 7A and 7B results in the establishing of a new customer account.

FIG. 8 is a picture of an initial account screen through which a Telco can create an account and then relate the account to customers already created by the Customer Relationships Manager software. To create an account, the Customer Billing Relationships software retrieves data from CRIS and CABS. FIGS. 9A, 9B, 10A and 10B illustrate the work flow associated with creating an account, including but not limited to relating accounts to customers and associating accounts to terms and conditions.

Figure 11:
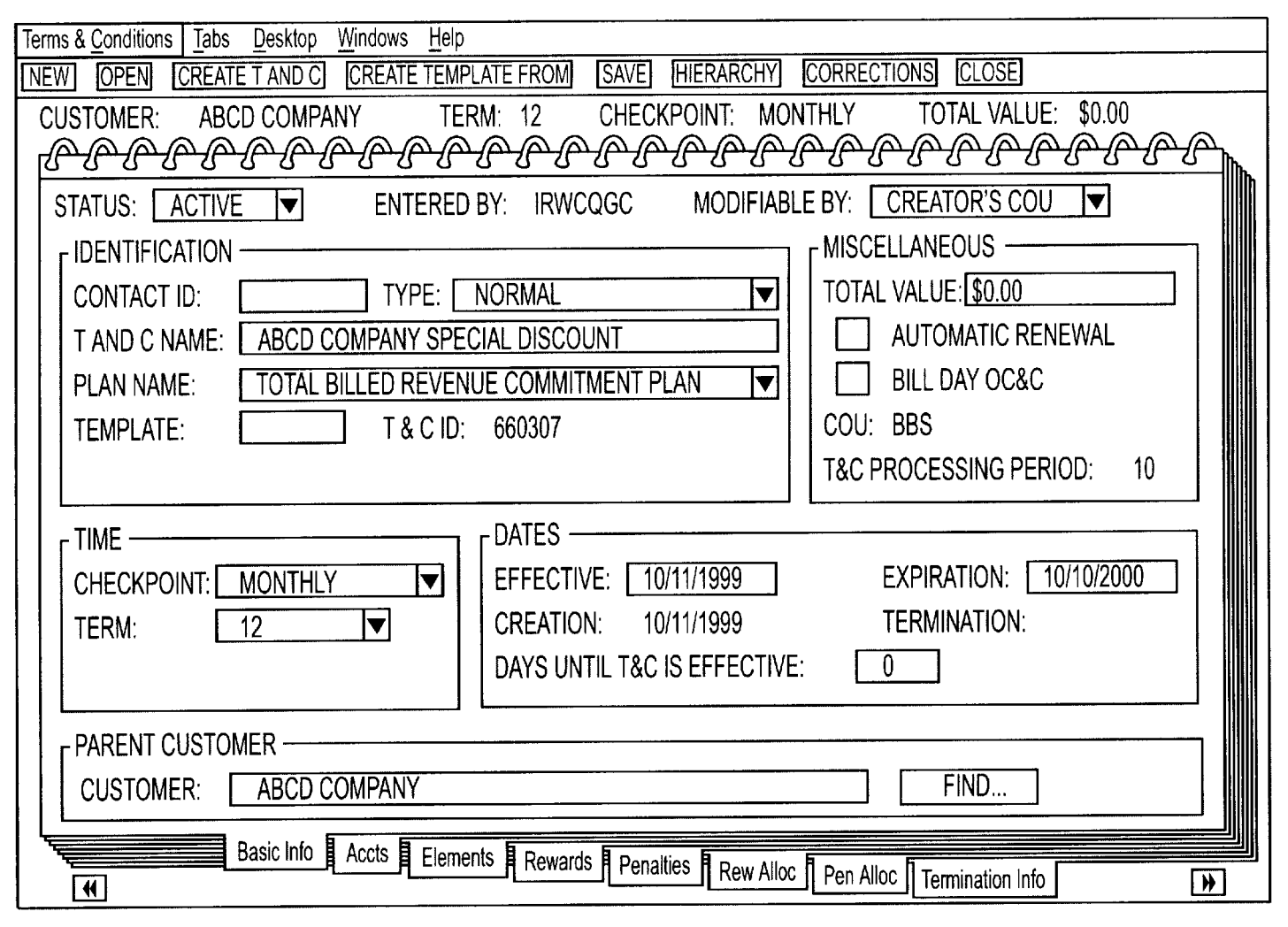

FIG. 11 is a picture of an initial terms and conditions screen used to create and implement a specific customer billing plan, such as an incentive discount plan. FIGS. 12A–12E and 13A–13G illustrate the work flow associated with establishing terms and conditions, associating accounts to terms and conditions, allocating rewards and penalties to accounts, and establishing termination criteria. Once established, the Telco awards or penalizes a customer's account depending on the customer's meeting or failing to meet the specified conditions. Performance can be measured on such criteria as revenue (e.g., total billed revenue) or quantity (e.g., subscribing to a certain number of access lines).

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for executing a telephone service billing plan comprising the steps of:

(a) accessing a first group of billing records of a customer from a customer record information system, wherein the first group of billing records is accessed from multiple customer operations units and multiple revenue accounting offices, accessing a second group of billing records of the customer from a carrier access billing system, wherein the second group of billing records is accessed from the multiple customer operations units and the multiple revenue accounting offices, and wherein the carrier access billing system maintains billing records for wholesale customers that purchase blocks of telephone capacity, and associating the first group of billing records with the second group of billing records to create a compiled group of billing records;

(b) automatically presenting a customer billing relationship based on the compiled group of billing records;

(c) creating and updating a customer billing plan based on the customer billing relationship; and (d) automatically implementing the customer billing plan based on the customer billing relationship.

2. The method of claim 1, wherein the step of creating and updating a customer billing plan comprises creating and updating terms, conditions, discounts, and promotions of the customer billing plan.

3. The method of claim 1 further comprising the steps of:

(e) reporting detailed billing information of the customer; and (f) providing means for correcting the detailed billing information.

4. The method of claim 1, wherein step (b) is comprised of displaying a customer view that groups accounts under a single logical customer, shows relations between two customers, and provides unique customer-based information.

5. The method of claim 1, wherein step (d) is automatically completed, without having to program a software code, by using online facilities, offline facilities, and a plurality of applications interfaces.

6. The method of claim 1, wherein step (d) comprises the steps of:

(i) retrieving, from the customer record information system and the carrier access billing system, data relevant to terms and conditions of the customer billing plan;

(ii) calculating a discount based on the data and the terms and conditions;

(iii) creating an other-charge-and-credit based on the discount; and (iv) passing the other-charge-and-credit to the customer record information system and the carrier access billing system for inclusion on a customer bill.

7. A computer network architecture comprising:

(a) a customer records information system;

(b) a carrier access billing system, wherein the carrier access billing system maintains billing records for wholesale customers that purchase blocks of telephone capacity;

(c) a customer billing relationships manager application that interfaces with the customer records information system and the carrier access billing system, accesses a first group of billing records of a customer from the customer record information system, wherein the first group of billing records is accessed from multiple customer operations units and multiple revenue accounting offices, accesses a second group of billing records of the customer from the carrier access billing system, wherein the second group of billing records is accessed from the multiple customer operations units and the multiple revenue accounting offices, associates the first group of billing records with the second group of billing records to create a compiled group of billing records, creates and maintains a customer view based on the compiled group of billing records, and supports online tasks and offline data maintenance and exchange; and (d) a customer terms and conditions manager application that is integrated with the customer billing relationships manager application, interfaces with the customer billing relationship manager application, the customer records information system, and the carrier access billing system, provides means to establish, monitor, take action on, and report on customer level terms and conditions, and includes both online and offline transaction capabilities and an internal monitoring functionality capable of triggering both online and offline activity.

8. The computer network architecture of claim 7, wherein the customer view shows accounts grouped together that are logically one customer, shows relationships between customers and other customers, and provides unique customer-based information.

9. The computer network architecture of claim 7, wherein the customer relationships manager application and the customer terms and conditions manager application comprise one or more components selected from the group consisting essentially of an online portion, a database, a report generator, offline interfaces, online interfaces, interfaces for updating changes to existing systems, and other application interfaces.

10. The computer network architecture of claim 9, wherein the online portion comprises graphical user interfaces, application servers, and database servers.

11. The computer network architecture of claim 10, wherein the graphical user interfaces reside on client workstations and the application servers reside on midrange UNIX systems.

12. The computer network architecture of claim 9, wherein the database resides on UNIX systems.

13. The computer network architecture of claim 9, wherein the online interfaces communicate with object management software.

14. The computer network architecture of claim 9, wherein the offline interfaces are coded in a business application computer programming language.

15. The computer network architecture of claim 9, wherein the other application interfaces communicate with object management software.

16. A computer network architecture comprising:
(a) a client system containing a client program;
(b) an application server containing an application server program; and
(c) a database server containing a database,
wherein in response to a user request for a customer billing relationships through the client system, the application server program retrieves information from the database, the application server program performs any required business logic, the application server program returns the information to the client program, and the client program formats and displays the customer billing relationships on a screen for the user,
wherein the application server contains business applications and legacy applications,
wherein the business applications are a customer billing relationships manager application and a customer terms and conditions application, and the legacy applications are a customer records information system and a carrier access billing system,
wherein the carrier access billing system maintains billing records for wholesale customers that purchase blocks of telephone capacity, and
wherein the information retrieved from the database includes
a first group of billing records from the customer record information system, wherein the first group of billing records is accessed from multiple customer operations units and multiple revenue accounting offices, and
a second group of billing records from the carrier access billing system, wherein the second group of billing records is accessed from the multiple customer operations units and the multiple revenue accounting offices.

17. A method for executing a telephone service billing plan comprising the steps of:
(a) accessing a first group of billing records of a customer from a customer record information system, wherein the first group of billing records is accessed from multiple customer operations units and multiple revenue accounting offices,
accessing a second group of billing records of the customer from a carrier access billing system, wherein the second group of billing records is accessed from the multiple customer operations units and the multiple revenue accounting offices, and wherein the carrier access billing system maintains billing records for wholesale customers that purchase blocks of telephone capacity, and
associating the first group of billing records with the second group of billing records to create a compiled group of billing records;
(b) automatically presenting a customer billing relationship based on the compiled group of billing records;
(c) creating and updating a customer billing plan based on the customer billing relationship;
(d) implementing the customer billing plan based on the customer billing relationship;
(e) reporting detailed billing information of the customer; and
(f) providing means for correcting the detailed billing information,
wherein the detailed billing information includes a reward total received by the customer, a list of accounts receiving rewards, and a revenue total collected from the customer.

18. The method of claim 17, wherein the step of creating and updating a customer billing plan comprises creating and updating terms, conditions, discounts, and promotions of the customer billing plan.

19. The method of claim 17, wherein step (b) is comprised of displaying a customer view that groups accounts under a single logical customer.

20. The method of claim 17, wherein step (d) is automatically completed, without having to program a software code, by using online facilities, offline facilities, and a plurality of applications interfaces.

21. The method of claim 17, wherein step (d) comprises the steps of:
(i) retrieving, from the customer records information system and the carrier access billing system, data relevant to terms and conditions of the customer billing plan;
(ii) calculating a discount based on the data and the terms and conditions;
(iii) creating an other-charge-and-credit based on the discount; and
(iv) passing the other-charge-and-credit to the customer record information system and the carrier access billing system for inclusion on a customer bill.

22. A computer network architecture comprising:
(a) a customer records information system;
(b) a carrier access billing system, wherein the carrier access billing system maintains billing records for wholesale customers that purchase blocks of telephone capacity;
(c) a customer billing relationships manager application that interfaces with the customer records information system and the carrier access billing system, creates and maintains a customer view, and supports online tasks and offline data maintenance and exchange,
wherein the customer view includes a customer billing relationship that associates billing records of a customer across multiple customer operations units and multiple revenue accounting offices; and
(d) a customer terms and conditions manager application that interfaces with the customer relationship manager application, the customer records information system, and the carrier access billing system, provides means to establish, monitor, take action on, and report on customer level terms and conditions, and includes both online and offline transaction capabilities and an internal monitoring functionality capable of triggering both online and offline activity.

23. The computer network architecture of claim 22, wherein the customer view shows accounts grouped together that are logically one customer.

24. The computer network architecture of claim 22, wherein the customer relationships manager application and the customer terms and conditions manager application comprise one or more components selected from the group consisting essentially of an online portion, a database, a report generator, offline interfaces, online interfaces, interfaces for updating changes to existing systems, and other application interfaces.

25. The computer network architecture of claim 24, wherein the online portion comprises graphical user interfaces, application servers, and database servers.

26. The computer network architecture of claim 25, wherein the graphical user interfaces reside on client workstations and the application servers reside on mid-range UNIX systems.

27. The computer network architecture of claim 24, wherein the database resides on UNIX systems.

28. The computer network architecture of claim 24, wherein the online interfaces communicate with object management software.

29. The computer network architecture of claim 24, wherein the offline interfaces are coded in a business application computer programming language.

30. The computer network architecture of claim 24, wherein the other application interfaces communicate with abject management software.

31. A computer network architecture comprising:

(a) a client system containing a client program;

(b) an application server containing an application server program: and (c) a database server containing a database, wherein in response to a user request for a customer billing relationship through the client system, the application server program retrieves information from the database, the application server program performs any required business logic, the application server program returns the information to the client program, and the client program formats and displays the customer billing relationship on a screen for the user, and wherein the customer billing relationship associates billing records of a customer across multiple customer operations units and multiple revenue accounting offices.

32. The computer network architecture of claim 31, wherein the application server contains business applications and legacy applications.

33. The computer network architecture of claim 32, wherein the business applications are a customer billing relationships manager application and a customer terms and conditions application, and the legacy applications are a customer records information system and a carrier access billing system, wherein the carrier access billing system maintains billing records for wholesale customers that purchase blocks of telephone capacity.

* * * * *

UNITED STATES PATENT AND TRADEMARK OFFICE
CERTIFICATE OF CORRECTION

PATENT NO. : 6,337,901 B1
DATED : January 8, 2002
INVENTOR(S) : Rome et al.

It is certified that error appears in the above-identified patent and that said Letters Patent is hereby corrected as shown below:

Column 17,
Line 15, should read -- object -- instead of "abject".

Signed and Sealed this

Twenty-third Day of April, 2002

Attest:

*Attesting Officer*

JAMES E. ROGAN
*Director of the United States Patent and Trademark Office*